United States Patent
Utter et al.

(10) Patent No.: US 12,135,558 B2
(45) Date of Patent: *Nov. 5, 2024

(54) SYSTEMS AND METHODS FOR GUIDED MANEUVERING WITH WAVE-OFF ALERTS

(71) Applicant: Modular Mining Systems, Inc., Tucson, AZ (US)

(72) Inventors: Christopher J. Utter, Tucson, AZ (US); Edward A. Branscombe, Tucson, AZ (US)

(73) Assignee: MODULAR MINING SYSTEMS, INC., Tucson, AZ (US)

( * ) Notice: Subject to any disclaimer, the term of this patent is extended or adjusted under 35 U.S.C. 154(b) by 26 days.

This patent is subject to a terminal disclaimer.

(21) Appl. No.: 17/826,012

(22) Filed: May 26, 2022

(65) Prior Publication Data

US 2022/0291691 A1  Sep. 15, 2022

Related U.S. Application Data

(62) Division of application No. 16/586,740, filed on Sep. 27, 2019, now Pat. No. 11,353,881.

(60) Provisional application No. 62/741,156, filed on Oct. 4, 2018.

(51) Int. Cl.
*G05D 1/00* (2024.01)

(52) U.S. Cl.
CPC ......... *G05D 1/0225* (2013.01); *G05D 1/0223* (2013.01); *G05D 1/0272* (2013.01); *G05D 1/0278* (2013.01)

(58) Field of Classification Search
CPC .. G05D 1/0225; G05D 1/0272; G05D 1/0223; G05D 1/0278; G05D 2201/021; G05D 1/0214; G05D 1/0212; G05D 2201/0201; E02F 9/262; E02F 9/2045; E02F 9/205; G08G 1/096888; G01C 21/10; G01C 21/3492; G01C 21/3617; A01B 69/008
See application file for complete search history.

(56) References Cited

U.S. PATENT DOCUMENTS

| | | | |
|---|---|---|---|
| 8,583,361 B2 * | 11/2013 | Lewis | G05D 1/0061 701/418 |
| 2018/0018880 A1 | 1/2018 | Smith et al. | |
| 2019/0367030 A1 * | 12/2019 | Tanaka | B60W 30/18036 |

* cited by examiner

*Primary Examiner* — Bao Long T Nguyen
(74) *Attorney, Agent, or Firm* — Quarles & Brady LLP

(57) ABSTRACT

A system for a vehicle is provided herein that includes a position sensor configured to identify a location of the vehicle and a heading of the vehicle. A human-machine interface (HMI) is operatively coupled with the vehicle. A controller is in electronic communication with the position sensor and the HMI. The controller is configured to access one or more databases to identify a first location, a first heading, and a first speed for the vehicle, and to identify a first aggregate heading value and a first aggregate speed value associated with the first location; determine that either the heading or the speed of the vehicle is outside of acceptable ranges; and issue a wave-off alert to the HMI when the vehicle is outside of acceptable ranges.

17 Claims, 20 Drawing Sheets

SYSTEMS AND METHODS FOR GUIDED MANEUVERING WITH WAVE-OFF ALERTS

CROSS-REFERENCE TO RELATED APPLICATION

This application is a divisional of U.S. patent application Ser. No. 16/586,740, filed under the same title on Sep. 27, 2019, which claims priority to U.S. Provisional Patent Application No. 62/741,156, filed under the same title on Oct. 4, 2018, the entire contents of which are incorporated herein by reference.

FIELD OF THE INVENTION

This disclosure is related to systems and methods for providing automated guidance directions to operators of heavy equipment, and specifically, to a system and method for providing guidance maneuvering assistance to heavy equipment operators.

BACKGROUND OF THE INVENTION

Mining environments, particularly open pit surface mining environments, present unique challenges to maintaining efficient operation of vehicles. The workhorse of a modern surface mine is a mine haul truck, which is a dump truck capable of hauling up to four hundred, and in some cases over four hundred, tons of material. Haul trucks are some of the largest land vehicles ever built. As such, haul trucks can have relatively slow acceleration and deceleration, and poor sight lines on along various portions of the vehicle. In particular, the rear and side opposite to the operator's cabin of a mine-haul truck present can present blind spots for the haul truck operator.

Within a mining environment there may be many other vehicles such as shovels, dozers, bucket wheel excavators, or other equipment that are each similarly difficult to control. Because the vehicles are so large, they can have blind spots, large turning radii, and slow braking capabilities, making navigating the vehicles to a given destination difficult. In many cases, though, by accurately positioning these vehicles in proximity to other vehicles or geographical features of the mine, the mine's efficiency can be improved.

In some examples of conventional pit mining operations, material is blasted from a face, picked up by a shovel, and loaded into the bed of a haul truck. The haul truck then moves the material to a crusher for processing. Shovels can be several times larger than a haul truck. A typical electric shovel can measure 100 feet in length from the rear of the crawler portion to a distal end of the bucket. The overall height of the shovel can measure 70 feet with a typical bucket height of 45 feet. A typical distance from the center of rotation of a shovel to the distal end of the bucket can be 80 feet.

Haul truck loading tends to be a rate limiting operation in the material extraction process of a mine. Conventionally, a haul truck will back up along a path that is perpendicular to a face positioned on one side of the shovel. Once the truck is in position beside the shovel, the shovel operator will retrieve material from the face and load the truck. Once loaded, the truck proceeds to a crusher. Given the size and responsiveness of a conventional mine truck, the process of navigating a truck into a desired position can take some time. Additionally, a collision between a mine haul truck and a shovel or other mining equipment can be catastrophic, resulting in millions of dollars in equipment damage and downtime. Accordingly, mine-haul truck drivers tend to be tentative when moving their vehicles into position for loading, further reducing the vehicle's efficiency.

In some instances, as a first truck is being loaded on a first side of a shovel, a second truck will move into position on the other side. This maximizes the use of the shovel, allowing it to be continuously, or intermittently, engaged in the loading operation, rather than waiting for the next truck to move into position.

FIG. 1 shows a conventional solution for assisting a mine-haul truck to navigate into a loading area besides a shovel. In the arrangement of FIG. 1, power shovel 105 is working at a mine face 102. Power shovel 105 includes lower assembly 110. Lower assembly 110 includes first and second crawler tread 115a, 115b. Power shovel 105 includes an upper assembly 120, which is rotationally coupled to lower assembly 110 via a rotational bearing 125. Upper assembly 120 includes boom 128. Attached to boom 128 at a hinge is a handle 130. At a distal end of handle 130 is a bucket 135. Upper assembly 120 also includes a cab 140 in which an operator of power shovel 105 resides. In the example operation shown in FIG. 1, power shovel 105 is electrically powered via dragline tether 145 which provides electrical energy to shovel 105. The upper assembly of a shovel often presents a large structure extending rearwards away from the shovel's cab. As the shovel rotates, both the boom and rear portion of the upper assembly can pose a hazard to nearby objects as it rotates about the shovel's rotational bearing. Because the shovel and upper assembly must enclose additional power generation machinery, the upper assembly of a hydraulic digger that does not rely on a dragline for power generally extends further in a rearward direction from the shovel's cab.

The conventional arrangement of FIG. 1 shows a first mine haul truck 150 in position to receive material from shovel 105. During the loading of first haul truck 150, however, shovel 105 is rotating back and forth between the first loading zone and the face 102. As such, second haul truck 165, which would otherwise be positioned on the opposite side of power shovel 105 from first haul truck 150, must keep clear of the arc of the tale and corners of the upper assembly 120 while loading is occurring at the first loading zone. The dangers inherent in backing a haul truck up to an operating shovel often cause truck operators to delay moving into position until the bucket of the shovel is already positioned over the second loading zone. This results in wasteful downtime.

The conventional solution to this problem is to attach a boom 155 ending in a visible marker 160 to the tail of the shovel 105. Occasionally, power line markers or traffic cones are used for the highly visible marker 160. Conventionally, the operator of the second truck 165 will use the highly visible marker 160 to align the second truck 165 while the first truck is being loaded. After loading of the first truck 150 is complete, and the shovel rotates the bucket back to the face 102 to pick up more material, the second truck 165 backs into position.

SUMMARY OF THE INVENTION

Embodiments of the present disclosure relate generally to systems and methods for alerting the operator of a vehicle or piece of heavy equipment to leave a defined region of interest (ROI) being maneuvered into a loading zone when it is detected that a heading and/or a speed of the vehicle or heavy equipment are outside of predefined threshold ranges, which may be location dependent and which may be defined based on heading and speed data collected from other vehicles that previously successfully navigated into the loading zone.

According to some examples of the present disclosure, a system includes a position sensor mounted to a vehicle. The position sensor is configured to identify a location of the vehicle and a heading of the vehicle. A human-machine interface (HMI) is operatively coupled with the vehicle. A controller is in electronic communication with the position sensor and the HMI. The controller is configured to access one or more databases to identify a first location, a first heading, and a first speed for the vehicle, and to identify a first aggregate heading value and a first aggregate speed value associated with the first location; determine, based on the first location, that the vehicle is located within a predefined region of interest (ROI) for a loading zone; compare the first heading and the first speed of the vehicle to the aggregate heading value and the aggregate speed value to determine that either the heading or the speed of the vehicle is outside of acceptable ranges, respectively defined by the aggregate heading value and a predetermined heading threshold value, and by the aggregate speed value and a predetermined speed threshold value, and issue a wave-off alert to the HMI indicating that the vehicle should leave the ROI.

According to some examples of the present disclosure, a system includes a position sensor mounted to a vehicle. The position sensor is configured to identify a location of the vehicle and a heading of the vehicle. An output device is configured to generate one or more outputs. A controller is connected to the position sensor and the output device, the controller configured to: determine when the vehicle is within a region of interest (ROI) of a loading zone, determine that the vehicle has selected the loading zone as a target destination, and determine positioning instructions to the vehicle or output device to place the vehicle within the loading zone.

According to some examples of the present disclosure, a method includes accessing one or more databases to identify a first location, a first heading, and a first speed for a vehicle, and to identify a first aggregate heading value and a first aggregate speed value associated with the first location, the vehicle including a position sensor mounted to a vehicle, the position sensor configured to identify a location of the vehicle and a heading of the vehicle. The method further includes determining, with a controller based on the first location, that the vehicle is located within a predefined region of interest (ROI) for a loading zone. In addition, the method includes providing instructions to an HMI for maneuvering the vehicle to the loading zone. The method further includes comparing, with the controller, the heading and speed of the vehicle to the aggregate heading value and the aggregate speed value to determine that either the heading or the speed of the vehicle is outside of acceptable ranges, respectively defined by the aggregate heading value and a predetermined heading threshold value, and by the aggregate speed value and a predetermined speed threshold value. Lastly, the method includes issuing, with the controller via the wireless communications network, a wave-off alert to an HMI mounted to the vehicle, wherein the wave-off alert causes the HMI to stop providing guidance into the loading zone and to indicate that the guidance has ceased.

These and other aspects, objects, and features of the present invention will be understood and appreciated by those skilled in the art upon studying the following specification, claims, and appended drawings.

BRIEF DESCRIPTION OF THE DRAWINGS

FIG. 6 is a chart illustrating raw aggregate heading values defined for different lateral offset and longitudinal offset coordinate locations defining a region of interest (ROI) for a loading zone, according to some embodiments.

FIG. 9 is a chart illustrating the result of applying a variation of nearest neighbor approximation to the raw aggregate heading values of FIG. 6, according to some embodiments.

DETAILED DESCRIPTION OF THE PREFERRED EMBODIMENTS

Figure 1:
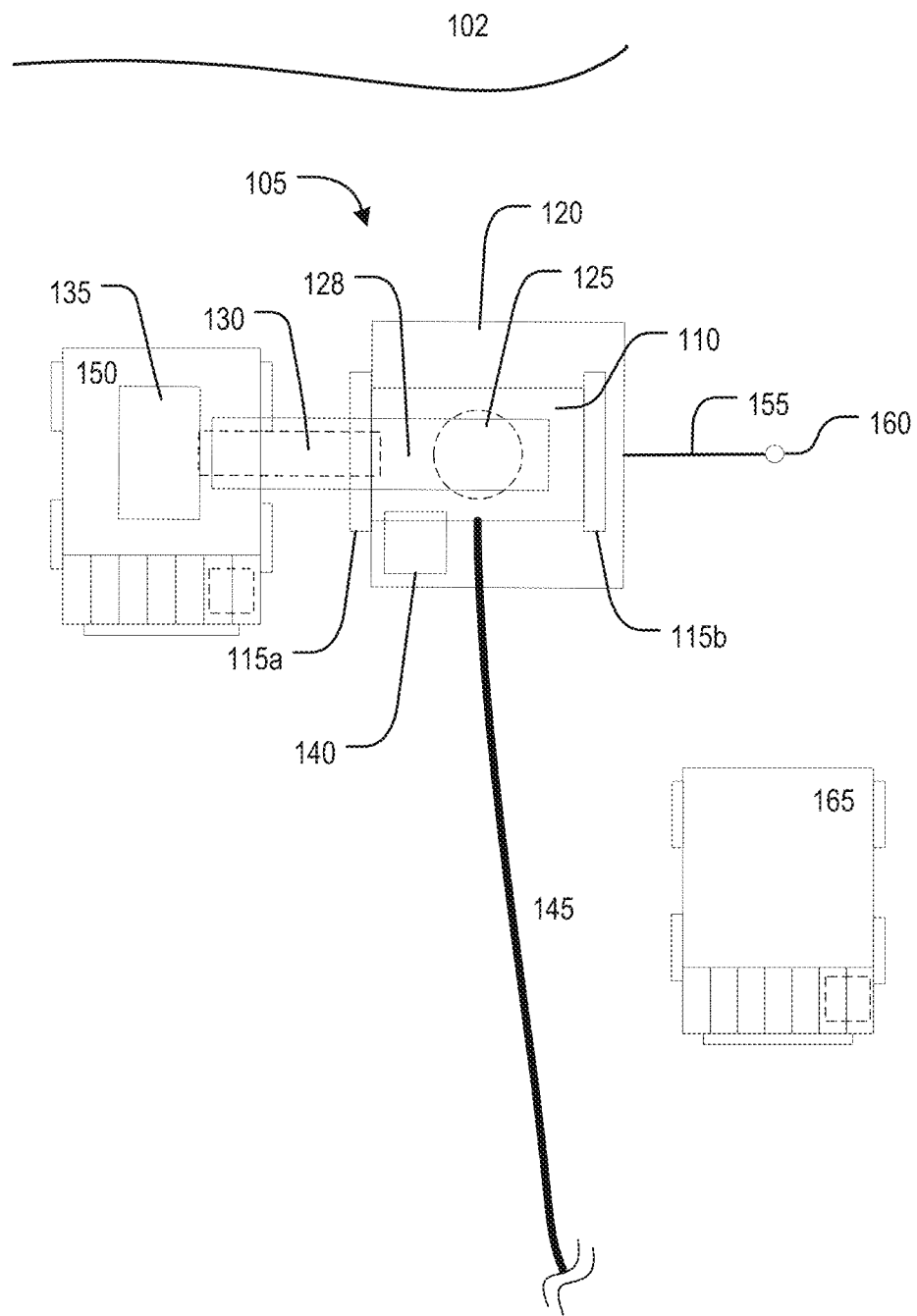
FIG. 1 is a diagram illustrating a conventional arrangement for guiding haul trucks into a loading position.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices, such as field programmable gate arrays, programmable array logic, programmable logic devices, or the like.

Modules may also be implemented in software for execution by various types of processors. An identified module of executable code may, for example, comprise one or more physical or logical blocks of computer instructions which may, for example, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, punch card, flash memory, integrated circuits, or other digital processing apparatus memory device.

The schematic flow chart diagrams included are generally set forth as logical flow chart diagrams. As such, the depicted order and labeled steps are indicative of some embodiments of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

This invention is described in various embodiments in the following description with reference to the Figures, in which like numbers represent the same or similar elements. Reference throughout this specification to "some embodiments," "an embodiment," or similar language means that a particular feature, structure, or characteristic described in connection with the embodiment is included in at least some embodiments of the present invention. Thus, appearances of the phrases "in some embodiments," "in an embodiment," and similar language throughout this specification may, but do not necessarily, all refer to the same embodiment.

Where, "data storage media," or "computer readable media" is used, Applicants mean an information storage medium in combination with the hardware, firmware, and/or software, needed to write information to, and read information from, that information storage medium. In certain embodiments, the information storage medium comprises a magnetic information storage medium, such as and without limitation, a magnetic disk, magnetic tape, and the like. In certain embodiments, the information storage medium comprises an optical information storage medium, such as and without limitation, a CD, DVD (Digital Versatile Disk), HD-DVD (High Definition DVD), BD (Blue-Ray Disk) and the like. In certain embodiments, the information storage medium comprises an electronic information storage medium, such as and without limitation, a PROM, EPROM, EEPROM, Flash PROM, compactflash, smartmedia, and the like. In certain embodiments, the information storage medium comprises a holographic information storage medium.

Reference is made throughout this specification to "signals." Signals can be any time varying electromagnetic waveform, whether or not encoded with recoverable information. Signals, within the scope of this specification, can be modulated, or not, according to any modulation or encoding scheme. Additionally, any Fourier component of a signal, or combination of Fourier components, should be considered itself a signal as that term is used throughout this specification.

In some examples, the present system facilitates the navigation of a mining vehicle or other equipment, such as a haul truck to a loading zone, and "waves off" the mining vehicle by providing a wave-off alert if it is detected that it is unfeasible or would excessive corrective maneuvering for the mining vehicle to enter the loading zone in a well-aligned fashion with a sufficiently high degree of accuracy. The system first identifies a vehicle that is within a region of interest (ROI) near a loading zone near heavy mining equipment (e.g., a shovel). For example, the ROI may be a substantially wedge-shaped region or regions (e.g., from a top-down perspective) extending from one or more sides of the loading zone. The loading zone may be selected by an operator of the identified vehicle as an intended target destination for the vehicle, or the system may identify the vehicle as potentially intending to enter the loading zone based on vehicle dynamics of the vehicle, such as the heading and the speed of the vehicle. As the identified vehicle navigates toward the loading zone, the present system provides feedback to assist the vehicle operator in following a predefined, a desired, an optimal, or a near-optimal path based on the location, speed, and heading of the vehicle, as defined by aggregate heading and speed data derived from historical heading and speed data collected from vehicles that were previously able to successfully navigate to the loading zone. When the vehicle is first identified by the system, or while the vehicle is travelling to the loading zone, the system may determine that, given the current location (e.g., based on lateral and longitudinal offsets) of the vehicle, the heading and speed of the mining vehicle differs (e.g., beyond a predetermined threshold) from an aggregate heading value and an aggregate speed value determined based on heading and speed data collected from vehicles that were previously able to successfully navigate from the current location to the loading zone within a predefined degree of accuracy. The collected heading and speed data may correspond to vehicles of the same type as the vehicle of the present example.

In response to making such a determination, the system may send an alert (e.g., a wave-off alert) the operator of the mining vehicle indicating that the driver should exit the ROI due to the non-ideal heading and/or speed of the mining vehicle and, optionally, should re-align and make another attempt to navigate to the loading zone. In some embodiments, the wave-off alert may cause a human-machine interface (HMI) that has been providing guidance to the operator of the vehicle into the loading zone to cease providing this guidance and to provide an indicator to the operator that the guidance has ceased. The HMI may be configured as an output device, operably coupled with one or more output devices, or operate in parallel with an output device. The HMI and/or the output device may provide any type of notification to the operator of the vehicle. For instance, the HMI or output device may provide a visual, an audible, and/or a tactile notification to the operator of the vehicle through any practicable assembly.

Figure 2:
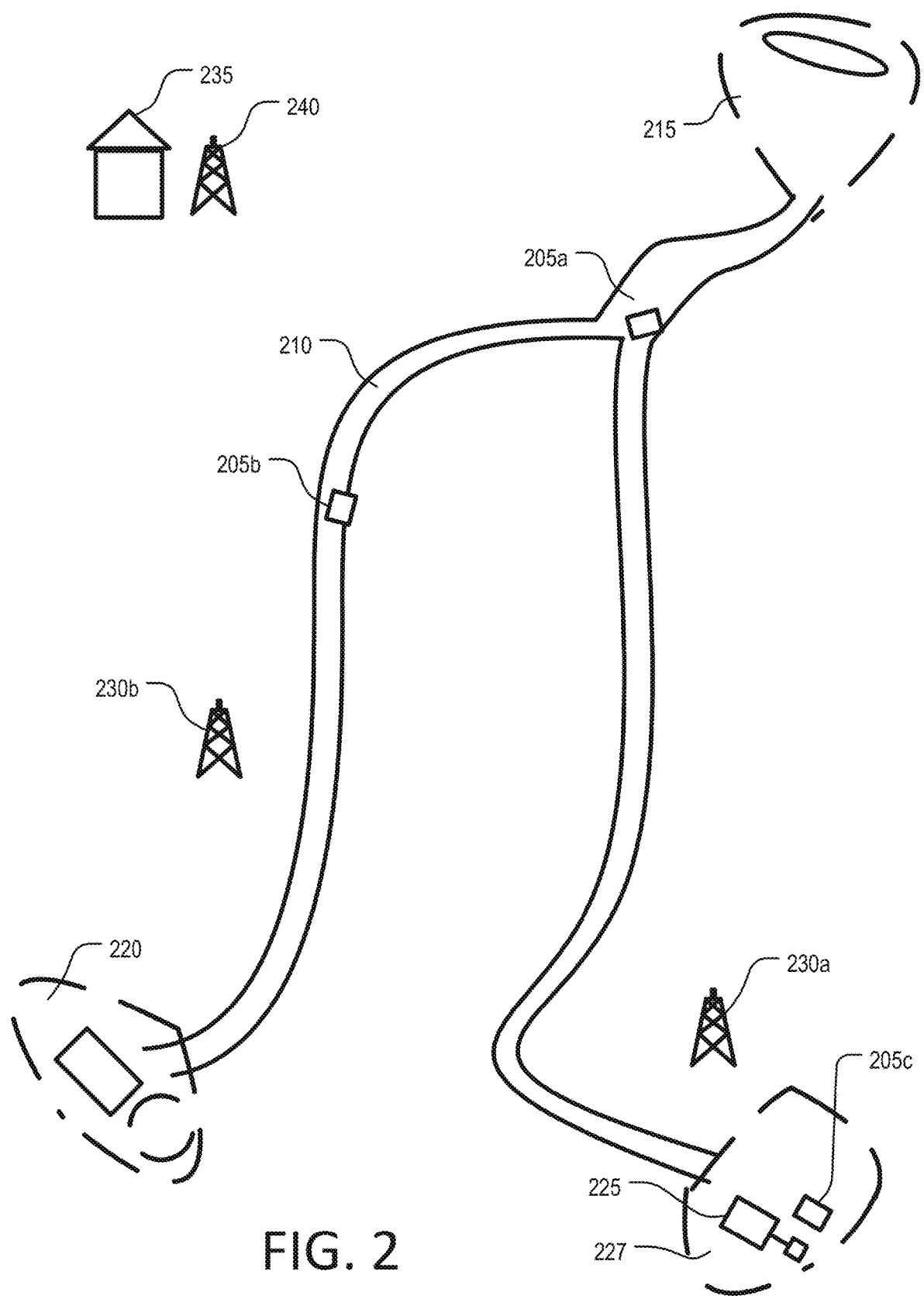
FIG. 2 is a schematic diagram of an open pit mining environment with a networked data collection and transmission system, according to some embodiments.

FIG. 2 is an illustration of an open pit mining environment where systems and methods according to some embodiments are implemented. In the environment of FIG. 2, one or more mine haul trucks 205a-c operate on a mine haul route network 210. Mine haul trucks 205a-c perform hauling tasks, for example, by moving material between a shovel site 225 a crusher site 220 and a dump or stockpile site 215.

Each mine haul truck 205a-c is equipped with an array of navigation, communication, and data gathering equipment that assist the haul truck's operator. For example, each mine haul truck 205a-s can be equipped with a mobile computing device, such as, a tablet personal computer, a personal digital assistant, or a "smart phone" for implementing the present system. The mobile computing device includes the basic functionality common to all computing devices, specifically, data processing, storage, input and output devices like displays, speakers and either dedicated or on-screen keyboards, and network communications interfaces. The mobile computing device and its functionality are discussed in greater detail below with respect to FIG. 3.

Each mine haul truck's mobile computing device is configured to receive data from a Global Positioning System (GPS) receiver, which generates information about the time-varying location of the truck 205a-c. Additionally, or alternatively, each mine truck's mobile computing unit receives data from a geolocation receiver, which generates information about the time-varying location of the truck 205a-c based on transmissions from transmitters located terrestrially, within the mining environment. The mobile computing device may also communicate with on-board sensors such as gyroscopes or inertial navigation systems for locating the haul truck 205a-c within the mine environment.

Each mine haul truck's mobile computing device operates in communication with a transceiver, which exchanges data directly, or indirectly, with other mine haul trucks and with a mine communications network 230a, 230b, and 240. In FIG. 2, the mine communications network is represented as a collection of wireless data transceivers, such as would be suitable in implementing a WiFi 802.11g or 802.11n, WiMax, GPRS, EDGE or equivalent network. These network architecture examples, however, are not limiting.

In practice, a mine communications network is typically an ad-hoc network consisting of various wired and wireless portions. The distances over which communications may occur in a mining environment, combined with the challenging and ever-changing topography of a mine, often prevent using strictly WiFi transceivers. The wireless portions of a mine communications network may not always be implemented using contemporary standards, and may include slower legacy systems. The only requirement for a mine communications network is that it allow for, at least, the sharing of data between a central mine management computer located at a central site 235, with one or more of the mine haul trucks 205*a-c*. In certain embodiments, central site 235 includes a central communications node 240 and a central computing device, for example, the device discussed below with respect to FIG. 3. In certain embodiments, transceivers located at the mine haul trucks 205*a-c* can act as network peers and may share information with one another directly, without the need to be in direct communication with the wider mine communications network.

In the embodiment of FIG. 2, power shovel 227 has a mobile computing device in communication with the communications network over a transceiver located at power shovel 227. The mobile computing device, which performs functions similar to those performed by the mobile computing devices located at mine haul trucks 205*a-c*, is at least adapted to communicate the location of the power shovel 227 to a central mine management application.

Figure 3:
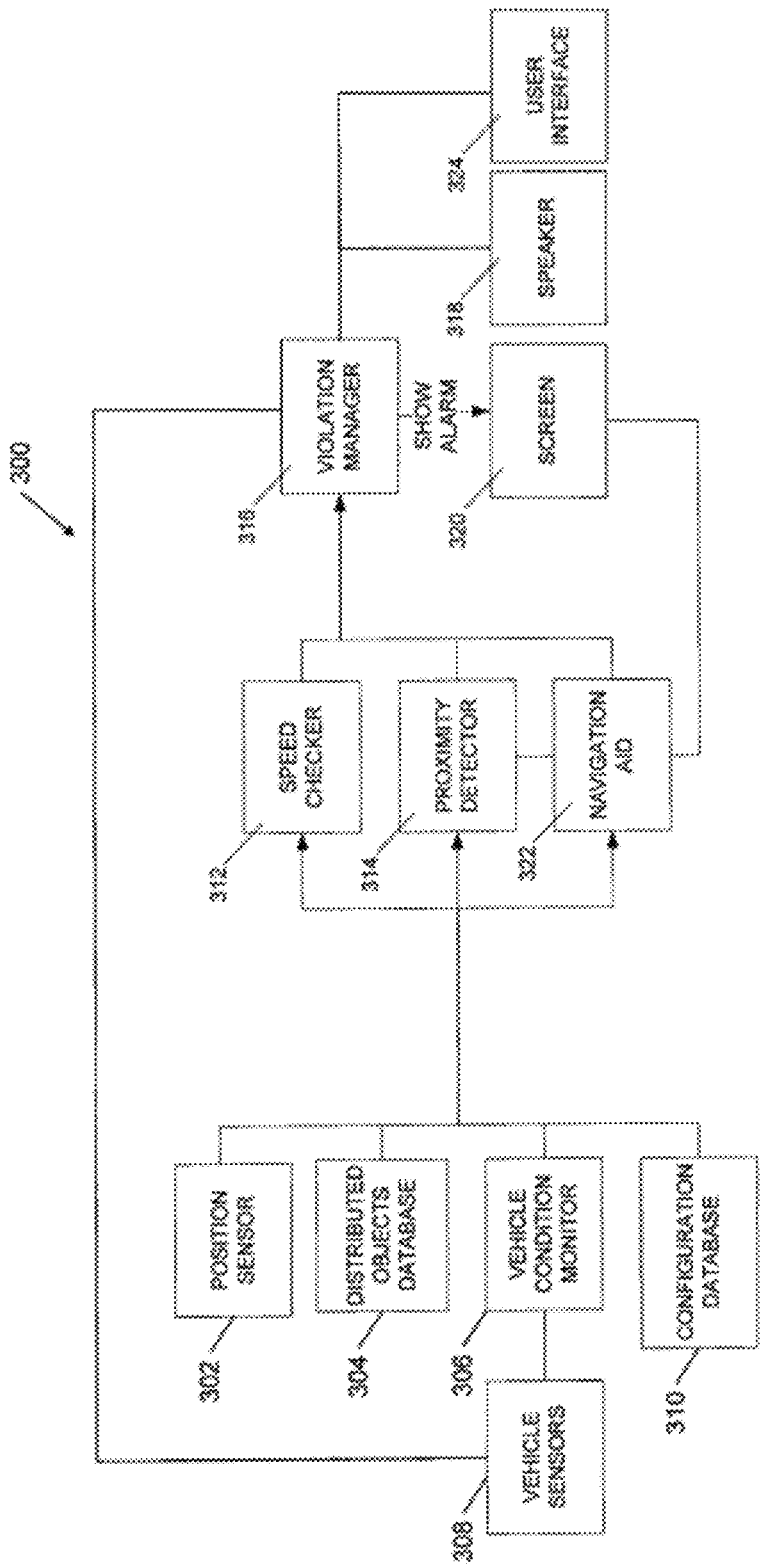
FIG. 3 is a functional block diagram showing the components of a navigation system running on a computing system, according to some embodiments.

FIG. 3 is a diagram illustrating functional components that can form portions of the present system for aiding navigation of a vehicle to a particular target destination, according to various examples. The system includes a number of sensors, databases (either locally accessible or accessed via a wireless electronic communications network), and processing elements implemented in hardware. The system is configured to generate a listing of candidate target destinations for the vehicle. The target destinations may include fixed locations such as parking spaces, crusher locations, repair facilities, loading zones, fueling facilities, or dump sites. The target destinations may also include movable targets, though, such as moving faces within the mining environment, moving vehicles, or moving roadways, for example. In some cases, the target destinations are themselves defined by the locations of other objects. For example, a number of target destinations (e.g., loading zones) may be defined around the perimeter of a shovel—for example at each side of the shovel, or may be defined based upon the location of other vehicles.

One or more components of the system can be mounted on/in, integrated with, or otherwise located on or within the vehicle. In various implementations, though, one or more of the systems (e.g., the various databases) may be installed at a central location of the mine where they may be updated and monitored by a central computing system. Generally, the components of the system shown in FIG. 3 may be installed directly into the heavy equipment vehicle and in direct, or indirect, communication with one another, or, if configured at a location away from the vehicle, the components are in wireless communication with the vehicle and components mounted therein. In other implementations, to provide redundancy, one or more of the systems illustrated in FIG. 3 may be duplicated in both the heavy equipment vehicle and an offsite location, for example, to provide redundancy.

In FIG. 3, system 300 includes a position sensor 302. The position sensor 302 detects the location of the vehicle, for example, by triangulating the vehicle's location in relation to satellites. The position sensor 302 might also determine the location of the vehicle by other processes such as by triangulating the vehicle's location in relation to terrestrial transmitters located in a mining environment. In certain embodiments, WiFi or WiMax network transceivers with fixed, known locations may be used to provide terrestrial points of reference. The position sensor 302 optionally can use a combination of methods or systems to determine location, for example, by determining a rough location using GPS and performing error correction by terrestrial references, such as broadcasting beacons mounted in and around the mining environment or other terrestrial reference points. In alternative embodiments, position sensor 302 also takes data from conventional RFID, RADAR, optical or other proximity or collision warning systems. These conventional systems can provide a warning signal to the vehicle operator and/or the operator of equipment in proximity to the vehicle if a piece of equipment such as a mine haul truck comes within some predefined range of another piece of equipment. Position sensor 302 also includes one or more systems for determining a heading (e.g., orientation) of the vehicle. The vehicle's current heading may be stored in a database of system 300, and in some embodiments, this database may maintain a record of the vehicle's heading over time. In some cases, heading may be determined by an electronically-readable compass or other systems that uses the earth's magnetic poles to determine heading. In other cases, the vehicle's heading may be sensed using one or more terrestrial beacons or devices mounted in and around the mining environment. In other cases, the vehicle's heading can be determined algorithmically, for example by tracking a movement of the vehicle over time, sensor 302 can make an accurate determination of the vehicle's heading.

In other implementations, position sensor 302 is assisted by a number of external devices that are mounted around various objects in the mining environment to assist in determining a location and a heading of the vehicle. For example, a number of radar, LIDAR, laser, or other object-detection systems could be installed at the entrance to a crusher bay or proximate other equipment disposed around the mining environment. As a vehicle approaches the bay, object-detection systems can scan the entrance to the bay and communicate the results of their scan to the vehicle. The vehicle uses the information received from the externally-mounted object-detection systems to supplement the information retrieved from position sensor 302 to generate a more accurate description of the vehicle's current location and heading. These object-detection systems can be used in any location of the mining environment, but may be particularly useful at bay entrances or at any location where a vehicle must navigate particularly accurately. These externally-mounted systems can be mounted on any equipment, features, or objects within the mining environment (e.g., shovels, buildings, crushers, etc.). The externally-mounted systems allow for peer-to-peer aggregation of vehicle and object location data within the mining environment allowing for more accurate information that can be acquired from sensors mounted on a single vehicle. In some examples includes an externally-mounted sensor system, a particular shovel may have a mounted scanning laser to accurately determine the location of a truck relative to the shovel. The data collected by the shovel using the laser system can then be communicated to the truck. That additional data can then be used by the truck to refine its own location data with respect to the shovel. The combination of location data collected by the truck's sensors, as well as the shovel's sensors can then be used in navigating the truck into position beside the shovel, for example.

When interacting with externally mounted object-detection systems, the external systems may only be able to observe a small portion of the vehicle. For example, when using LIDAR or radar for instance, the systems may only be able to communicate information regarding distance from the detection system to the side of the vehicle that is being presented to the object-detection system—the other sides of the vehicle will be obscured. In that case, though, the present system can use the information received from the object-detection system (including the location of the object-detection system itself) to supplement data retrieved from position sensor 302.

System 300 includes a number of databases storing information useful in providing the functionality of the present disclosure. Distributed objects database 304 stores a listing of objects that are present within the mining environment. Distributed objects database 304 can store listings of candidate target destinations (where each object in the database may be a target), the location of vehicles and hazards or boundaries within the mining environment. Additional objects stored in distributed objects database 304 can include roadways, parking areas, repair facilities, buildings or structures, dumping areas, or power lines.

System 300 also includes vehicle condition monitor 306. Vehicle condition monitor 306 is configured to monitor one or more systems within the vehicle and determine a current status or condition of those systems. In some cases, vehicle condition monitor 306 communicates with one or more vehicle sensor 308 mounted in and around the vehicle to determine the current status of those systems. For example, vehicle condition monitor 306 may monitor a current status of the vehicle's fuel level or fuel status, wheel positions (e.g., in two-wheel or four-wheel configurations, the angle of the wheels can be measured), current selected gear (e.g., forward or backward gears), braking status, etc. Vehicle condition monitor 306 can also determine whether the vehicle is carrying a load or whether the vehicle is empty. Vehicle condition monitor 306 can also track a current speed of the vehicle. The vehicle's current speed may also be stored in a database of system 300, and in some embodiments, the database may maintain a record of the vehicle's speed over time. When the vehicle includes sensors for monitoring a conditions of various components of the vehicle (e.g., engine temperature, tire pressure, battery charge levels), vehicle condition monitor 306 can also communicate with those sensors to identify the current status of the connected systems.

System 300 also includes configuration database 310. Configuration database 310 may store information describing certain vehicle attributes or conditions that are to be met before the vehicle can undertake a particular maneuver. This information may be stored in configuration database 310 for a single vehicle or for multiple vehicles. For example, configuration database 310 may store a set of conditions that must be met before the vehicle can navigate to a particular target destination. Example conditions include that the vehicle be in a forward gear, that any emergency braking systems be disengaged, that the vehicle have sufficient fuel to complete a particular journey, that the vehicle not be scheduled for emergency maintenance that the vehicle must undergo before the navigation can occur, etc. The set of conditions included in configuration database 310 can be different based upon the vehicle and the particular maneuver the vehicle is attempting to undertake.

Additionally, configuration database 310 may include aggregate data derived from historical data collected from one or more vehicles that have previously successfully navigated from various addressable locations within a predefined ROI around a power shovel (or any other applicable piece of heavy equipment) to a loading zone of that power shovel (e.g., within a predefined degree of accuracy), said historical data including periodically-sampled heading values and speed values of the vehicle(s) at each of the various locations within the ROI. Each addressable location within the ROI may be defined by a latitude offset and a longitude offset from predefined central point (e.g., the power shovel), as will be described in more detail below in connection with FIGS. 5-9. As an example, the historical data may correspond to the periodic heading and speed of vehicles attempting to back into a loading zone next to a power shovel. The aggregate data may include aggregate speed values and aggregate heading values which may be generated by first averaging the historical speed data and historical heading data for each respective location in the ROI to determine a mean speed value and a mean heading value for that location. This mean speed value and mean heading value may be referred to herein as "raw aggregate speed value" and "raw aggregate heading value," with the collective raw aggregate speed values and raw aggregate heading values respectively making up raw aggregate speed data and raw aggregate heading data. This raw aggregate speed data and raw aggregate heading data may be referred herein to as "raw aggregate data." Interpolation (e.g., nearest neighbor interpolation) may be applied to the raw aggregate speed value and the raw aggregate heading value for each location in order to provide smoothing to produce an aggregate heading value and an aggregate speed value. Collectively, the aggregate heading values for all locations within the ROI may be referred to herein as "aggregate heading data" and the aggregate speed values for all locations within the ROI may be referred to herein as "aggregate speed data." The aggregate data stored in configuration database 310 includes both the aggregate speed data and the aggregate heading data. Thus, the aggregate data defines smoothed/interpolated mean speed and mean heading values for each location within the ROI that are derived from recorded (e.g., historical) speed and heading values of one or more vehicles that previously successfully navigated to a loading zone from locations within the ROI. One or more predetermined threshold values may also be stored in configuration database 310, which may define a range of acceptable speed values centered at the aggregate speed value and a range of acceptable heading values centered at the aggregate heading value for each location. This historical data and aggregate data may be updated periodically as the vehicle successfully navigates to the loading zone and, optionally, as other vehicles successfully navigate to the loading zone. In some embodiments, the historical data may be weighted when calculating the aggregate data, such that historical heading values and speed values corresponding to previous successful navigation into the loading zone by the present vehicle and/or by the present operator of the vehicle are assigned heavier weights compared to historical heading values and speed values corresponding to other vehicles and/or operators, such that these more heavily weighted historical heading values and speed values provide a greater contribution to the aggregate heading value and the aggregate speed value. In some embodiments, some or all data stored within configuration database 310 may be periodically updated from a central application (not shown). In some embodiments, configuration database 310 may be stored in a remote memory (e.g., with respect to the vehicle) that is accessible via a wireless electronic communications network.

The system 300 includes a number of modules (e.g., which may be implemented at least partially in a remote application) that act on data received from one or more of position sensor 302, distributed objects database 304, vehicle condition monitor 306, and configuration database 310.

The system 300 includes navigation aid 322 that is configured to receive and analyze data from one or more of position sensor 302, distributed objects database 304, vehicle condition monitor 306, and configuration database 310 to assist an operator of the vehicle to navigate to a particular target destination.

If the vehicle is within the ROI of a loading zone and the loading zone has been selected as a target destination, navigation aid 322 may verify that the vehicle can begin moving using vehicle condition monitor 306 and configuration database 310. If so, navigation aid 322 constantly monitors the current location of the vehicle with respect to the loading zone using position sensor 302. Using the vehicle's current location and heading, navigation aid 322 uses screen 320 to provide feedback to the vehicle operator to assist the operator in maneuvering the vehicle into the loading zone. As the vehicle begins to deviate from an acceptable heading and speed (e.g., as defined by the aggregate data stored in configuration database 310), navigation aid 322 may use screen 320 to provide feedback to the operator instructing the operator to turn the vehicle and/or adjust the speed of the vehicle to return to a heading and a speed that are closer to the aggregate heading and the aggregate speed. Alternatively, feedback could be provided via other user interfaces 324. For example, navigation instruction could be provided by the vehicle's rear view mirrors. A number of light sources (e.g., LEDs) may be disposed around the housing of the rear view mirror. By illuminating various combinations or colors of the light sources, the vehicle operator can be instructed to maintain the current course, steer to the left by a small degree, steer to the right by a small degree, steer to the left by a large degree, or steer to the right by a large degree. In other implementations, user interface 324 could include a heads-up display or virtual reality output for displaying a particular path, route, or other information for the vehicle operator. Additionally, voice instruction could assist an operator in navigating to the loading zone.

In some embodiments, if, upon entering the ROI with the loading zone selected as a target destination or while navigating to the loading zone, the heading and speed of the vehicle are determined to deviate from the aggregate heading value and the aggregate speed value corresponding to the location of the vehicle by an amount (e.g., percentage) that is greater than the predetermined threshold value(s) stored in configuration database 310, a wave-off alert may be issued by navigation aid 322 to the operator of the vehicle. In an alternate embodiment, the wave-off alert may instead be issued in response to determining that the heading or speed of the vehicle is outside of the range of acceptable heading values or the range of acceptable speed values stored in configuration database 310. The wave-off alert may instruct the operator to exit the ROI (e.g., in order to re-align the vehicle). The wave-off alert may be issued in the form of a notification presented on screen 320, an audible notification provided through speaker 318, powering on one or more lights of user interface 324, or any other desired form of alert. In some embodiments, the wave-off alert may instead be provided to system 300 by an external system and/or application (e.g., a central system/application or a system/application running on a piece of heavy equipment such as a shovel; not shown). In some embodiments, light sources in the cabin of the vehicle that are used to provide navigation instruction may also be used to convey a wave-off alert to the operator. In some embodiments, the wave-off alert may cause an HMI that has been providing guidance to the operator of the vehicle into the loading zone to cease providing this guidance and to provide an indicator to the operator that the guidance has ceased.

System 300 may also include speed checker 312. Speed checker 312 is configured to check the speed of the vehicle against an allowable speed retrieved from distributed objects database 304 for the vehicle's current location (determined by position sensor 302). Speed checker 312 can calculate the vehicle's speed using GPS or other data received from the position sensor or might read the vehicle's speed directly from the vehicle.

System 300 may also include proximity detector 314 that checks the vehicle's location against the location of objects defined in distributed objects database 304. The vehicle's location may be checked against objects such as, for example, defined hazards, other vehicles, areas that have been defined as out-of-bounds or not on a defined route, or areas that are on a defined route but that only permit a particular direction of travel. In some cases, proximity detector 314 compares the vehicle's current location to a number of hazard zones that are defined around a particular object. Depending upon which (if any) hazard zones the vehicle currently occupies, proximity detector 314 can cause different levels of alarm to be sounded for the operator of the vehicle.

Information from the speed tracker 312, proximity detector 314, and one or more of vehicle sensors 308 is passed to violation manager 316. Violation manager 316 includes a rule set that compares the location and attitude of the vehicle with attributes defined in distributed objects database 304 and returns an indication if certain rules are violated.

System 300 can optionally include a user messaging function to alert the vehicle operator of messages, such as instant messages or electronic mail, relayed to system 300 from a central application not shown. When a user receives a message, audible alarms can be sent to speaker 318 and visual alarms as well as a display of the message itself can be sent to screen 320.

System 300 may also optionally include a data storage module that is updated from a central application (not shown). For example, system 300 may include a database or other data storage system that stores roadmap data, overhead imaging data, or time varying data on a remote vehicle's location and/or condition. The database can be periodically updated by the central application (not shown), through a data synchronizer.

System 300 along with any necessary data storage and communications hardware can be included in a variety of electronic devices, for example, handheld personal data assistants (PDAs), laptop computers, or "smart" cellular telephones.

Figure 4:
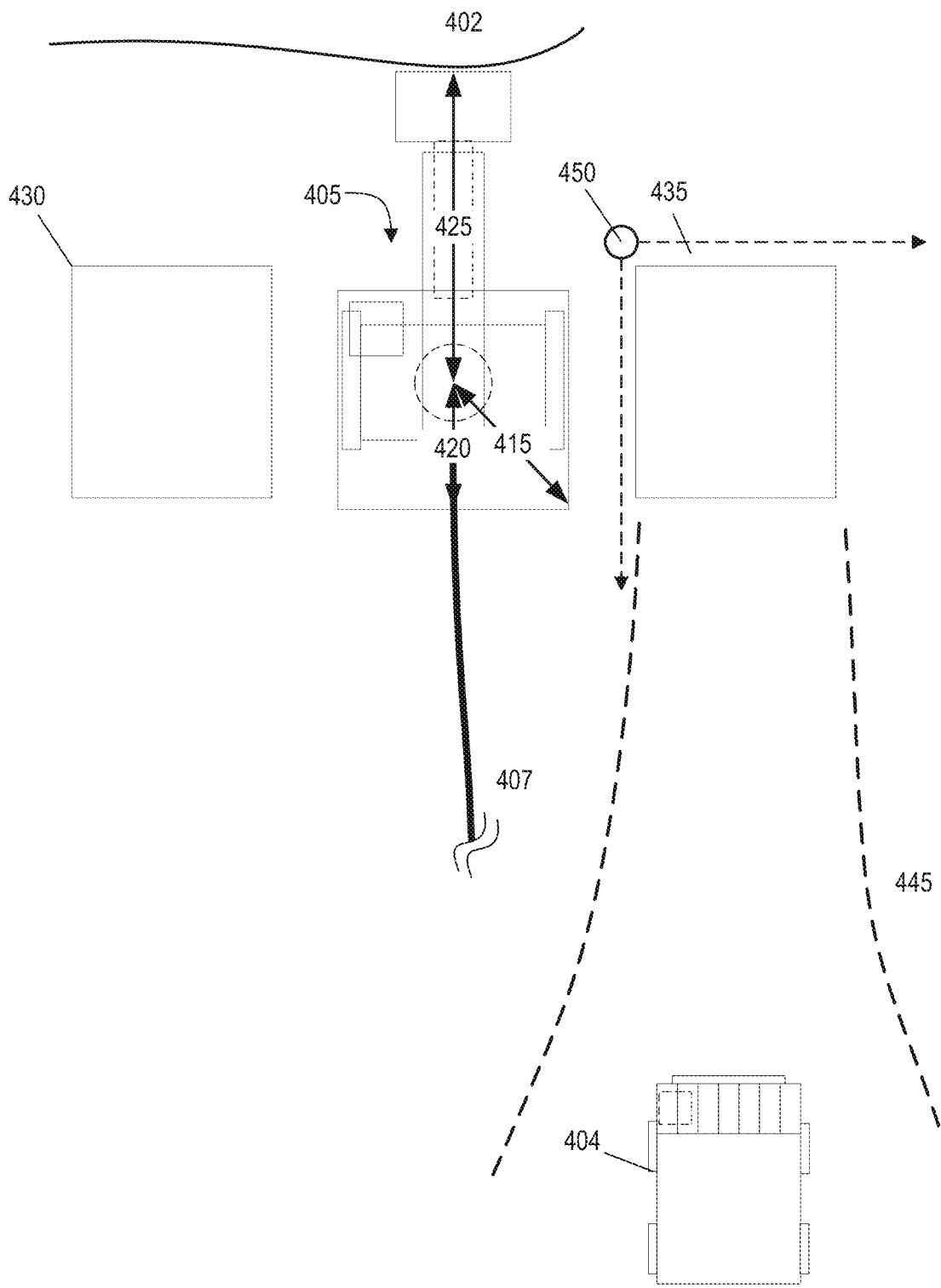
FIG. 4 is a diagram showing an example arrangement of a mine haul truck and a shovel where loading areas are arranged proximate to the shovel.

FIG. 4 shows an arrangement for navigation assistance in which a power shovel 405 is positioned at a face 402 for loading operations and depicts the present system, according to various implementations, where a haul truck 404 uses the navigation system to assist in positioning the haul truck 404 at a loading zone next to the shovel. In some implementations of the present system, the illustration shown in FIG. 4 is displayed by navigation aid 322 on screen 320 described in FIG. 3.

There are a number of shovel-related parameters of interest that may be used to identify one or more loading zones around the shovel. The most significant parameter is the shovel's location that can be measured directly by a GPS receiver or calculated on the basis of known dimensions of the shovel and the location of the GPS antenna. Additional useful parameters are the tail drag radius 420, the corner drag radius 415, and the boom radius 425. These parameters set the outside envelope for the space the shovel will occupy during loading operations and can be defined in a database such as distributed objects database 304 shown in FIG. 3. These parameters are illustrated in FIG. 4 with reference to the center of rotation of the upper assembly of shovel 405.

In FIG. 4, haul truck 404 wishes to navigate to a position beside shovel 405 to receive material. Accordingly, the operator of truck 404 uses the present system to initiate a navigation maneuver. First, the present system (e.g., navigation aid 322 and screen 320 of FIG. 3) identifies two candidate target destinations, loading zone 430 and loading zone 435. The target destinations are displayed for the vehicle operator and the operator can select one of the target destinations to initiate the maneuver. Alternatively, a target destination could be selected automatically, or a selection may be made by another individual or vehicle operator (e.g., a dozer operator at a dump, foreman, etc.) having control authority over the vehicle.

If, for example, loading zone 435 is selected as the target destination of truck 404, the present system identifies a ROI 445 that includes to multiple addressable locations from which truck 404 may navigate to loading zone 435 (e.g., based on historical and aggregate data). As seen in FIG. 4, the boundary of path 445 can be selected to avoid cable 407 and other hazards and boundaries that should be avoided by truck 404. Additionally, although at first, the boundaries of ROI 445 are relatively wide, as truck 404 approaches shovel 405, the ROI narrows to ensure that truck 404 is safely guided into loading zone 435.

In some embodiments, ROI 445 may, for example, be monitored by the present system to identify any trucks located within ROI 445, such as truck 404. If the heading and speed of truck 404 are within an acceptable range (e.g., within the predefined threshold value(s)) of the aggregate heading and aggregate speed (e.g., as defined in configuration database 310) for the current location of the identified truck in ROI 445, it may be determined that truck 404 intends to enter loading zone 435, regardless of whether truck 404 has selected loading zone 435 as a target destination. If, while navigating to loading zone 435, the heading and speed of truck 404 leave the acceptable range defined for the location of truck 404, a wave-off alert may be provided to the operator of truck 404.

To assist in navigating truck 404 into loading zone 435 externally mounted object-detection system 450 may be mounted next to loading zone 435. As the truck approaches loading zone 435, the truck communicates with system 450 to retrieve additional information describing the location and heading of truck 404. In some implementations, system 450 includes a radar or LIDAR object detection system.

As discussed below, various attributes of loading zone 435 such as size, preferred direction of entry, etc., can be at least partially determined by various characteristics of truck 404. Additionally, some or all of these attributes may be set by a supervising entity or by the operator of power shovel 405.

In order to generalize a defined ROI for loading zones such as loading zone 435 in a variety of different geographical locations, the center of a given loading zone may be defined as an lateral and longitudinal offset from the location of a piece of heavy equipment such as power shovel 405. This offset may be defined as a difference between the GPS location of the center of the heavy equipment and the GPS location of the center of the loading zone, with the center of the heavy equipment considered the origin. Locations within the ROI may then be defined as a set of coordinate values offset from the center of the loading zone. This offset may be expressed as a difference between the GPS location of the center of the loading zone and the GPS locations corresponding to each location within the ROI, with the center of the loading zone considered the origin. Additionally, an offset heading for a vehicle in the ROI, such as truck 404, may also be defined as the offset between the heading (relative to North) of the loading zone such as and the heading (relative to North) of the vehicle within the ROI.

Figure 5:
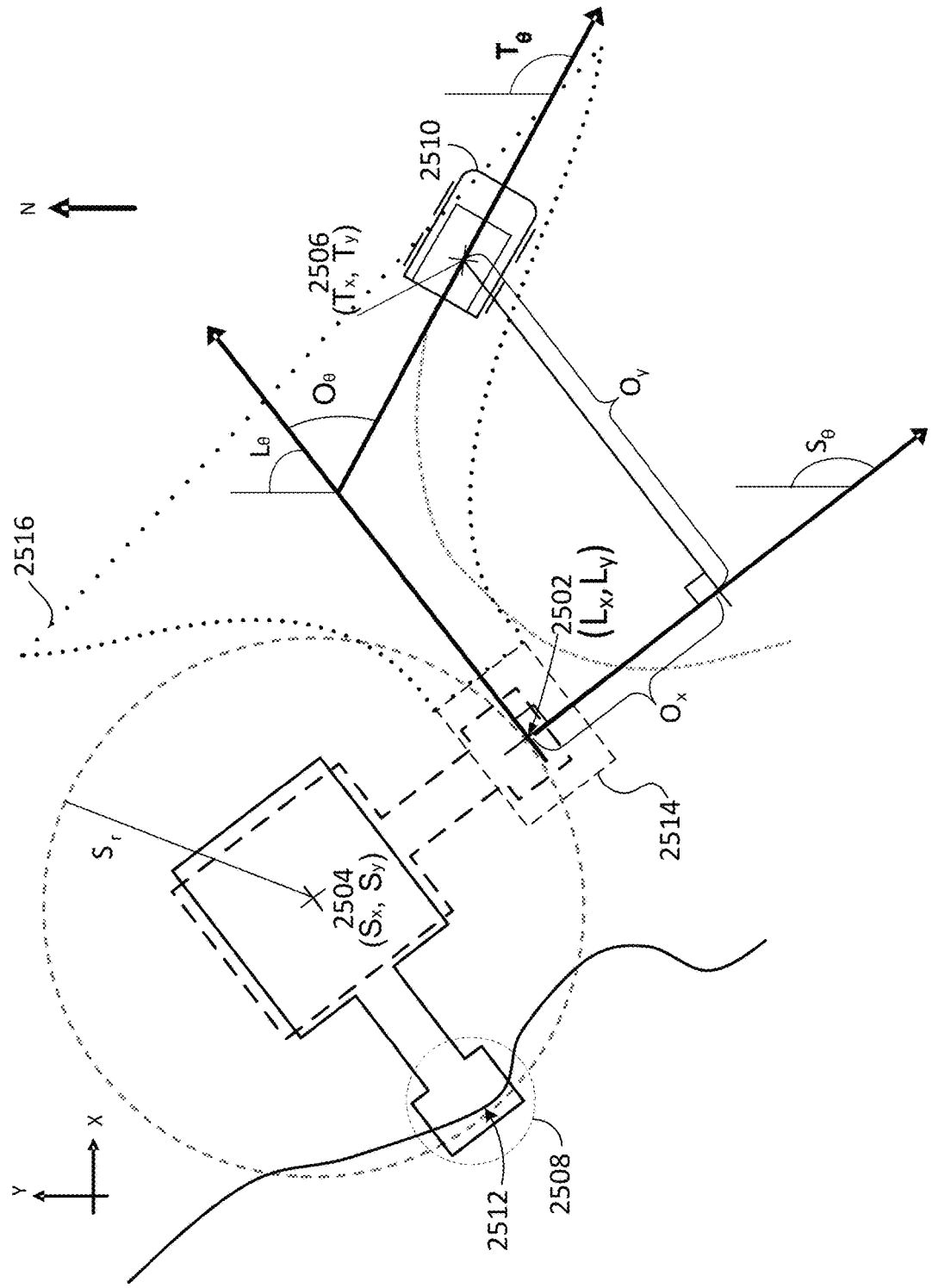
FIG. 5 is a schematic illustrating an offset of a vehicle from a target loading location, according to some embodiments.

FIG. 5 is a schematic illustrating an offset of a vehicle from a target loading zone, which may be determined manually and/or through one or more components of the present system. For example, a shovel operator of a power shovel 2504 positions the bucket or load 2508 at a desired loading zone 2514 and, using a human-machine interface (HMI), sets that position as an active loading zone. The operator may set a right or left loading zone (or both), where the right zone is clockwise from the dig point 2512 (in the example illustrated in FIG. 5, when viewed from above), and the left zone is counterclockwise. In the example depicted in FIG. 5, the operator indicates a left zone 2514—centered at load location 2502. The operator may also specify a desired loading radius or use a preconfigured value. The remote application records the shovel center pin position 2504 ($S_x$, $S_y$), heading $S_\theta$ (the orientation of the bucket 2508 relative to the North), and loading radius $S_r$. The location of the shovel could be determined using any suitable geolocation technology, as described herein.

The coordinates ($L_x$, $L_y$) of the load location 2502 can be calculated as:

$$L_x = S_r \sin(S_\theta) + S_x \quad (1)$$

$$L_y = S_r \cos(S_\theta) + S_y \quad (2)$$

The heading $L_\theta$ (the orientation of the load relative to the North) of the load at load location 2502 is offset by 90 degrees from Se for right side load locations, and −90 degrees for left side locations:

$$L_\theta = S_\theta + 90 \text{(right side) or } L_\theta = S_\theta - 90 \text{(left side)} \quad (3).$$

Then, vehicle offset positions are calculated. The vehicle offset position describes in terms of location and heading (e.g., orientation) how the vehicle is offset from load location 2502. A vehicle 2510 arrives at a location 2506 of coordinates ($T_x$, $T_y$) and heading $T_\theta$ within a ROI 2516 for loading zone 2514. Offset coordinates ($O_x$, $O_y$) ($O_x$ and $O_y$ can be referred to as lateral offset and longitudinal offset, respectively) and offset heading $O_\theta$ describe the vehicle's location and heading in a coordinate system with its origin at the load location 2502 ($L_x$, $L_y$) and its vertical axis parallel to the load heading $L_\theta$.

The offset coordinates ($O_x$, $O_y$) can be calculated as:

$$O_x = (T_x - L_x)\cos(L_\theta) - (T_y - L_y)\sin(L_\theta) \quad (4),$$

$$O_y = (T_x - L_x)\sin(L_\theta) + (T_y - L_y)\cos(L_\theta) \quad (5).$$

The offset heading $O_\theta$ can be calculated as:

$$O_\theta = T_\theta - L_\theta \quad (6)$$

Lastly, based on trigger criteria, coordinates ($O_x$, $O_y$) and heading $O_\theta$ are fed to a feedback mechanism. The feedback mechanism may link one or more of the offset variables to a visual or audio representation. For example, with reference to FIG. 10, horizontal lights 1606 and 1608 could represent lateral offset $O_x$, central ring 1610 could represent offset heading $O_\theta$. Longitudinal offset $O_y$ could be indicated using an audible beep. The lateral and longitudinal offsets, $O_x$ and $O_y$, may be used to define locations within ROI 2516, such that each location within ROI 2516 is independently addressable by coordinates ($O_x$, $O_y$). The collected historical data and calculated aggregate data described above in connection with FIG. 3 may be defined, such that each historical heading value, each historical speed value, each aggregate heading value, and each aggregate speed value are respectively associated with one of the coordinate locations within ROI 2516. For example, for a given location at coordinates ($O_1$, $O_1$), at least one historical heading value and at least one historical speed value may be defined in the historical data, and an aggregate heading value and an aggregate speed value may be defined in the aggregate data.

Figure 6:
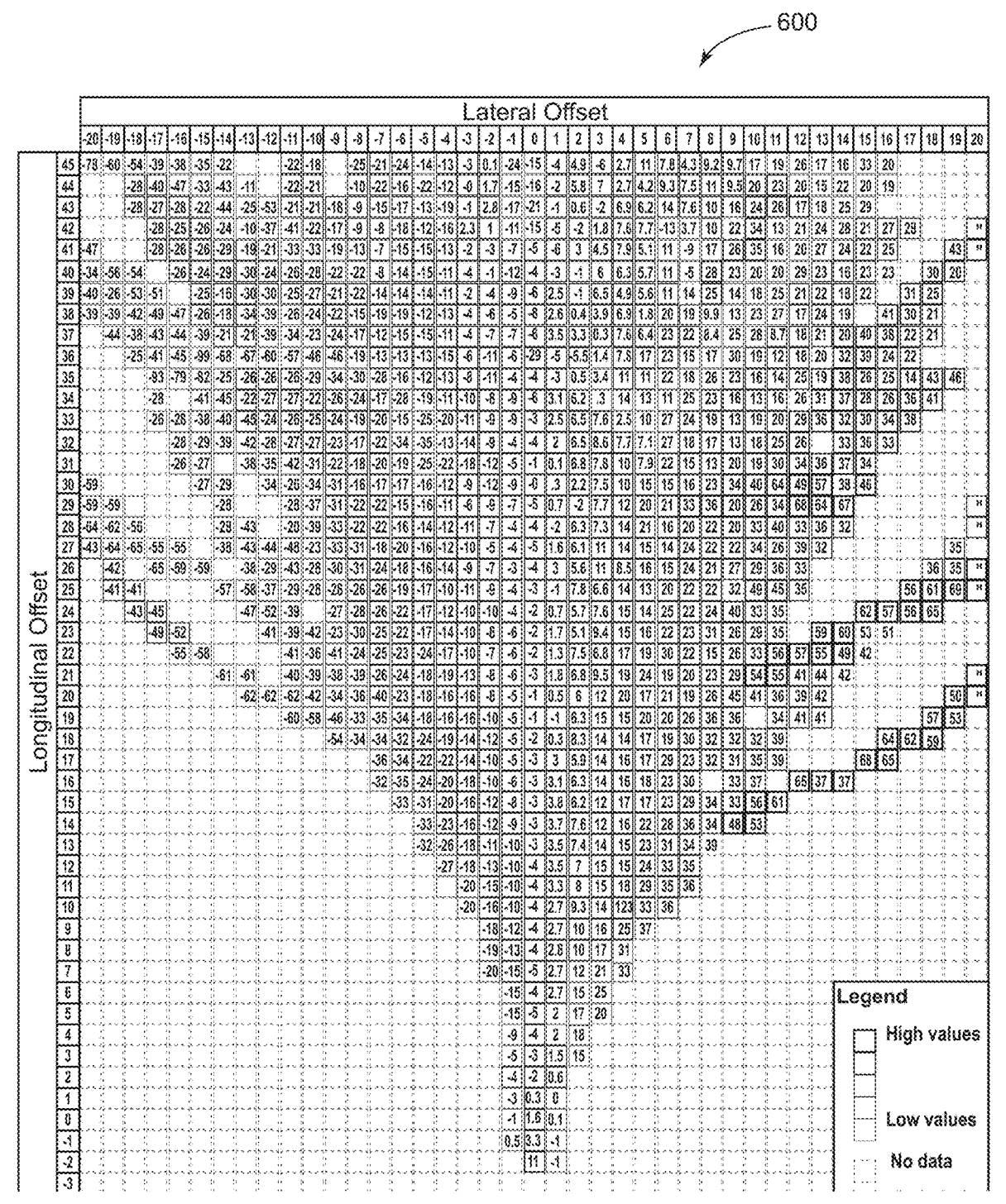
Figure 7:
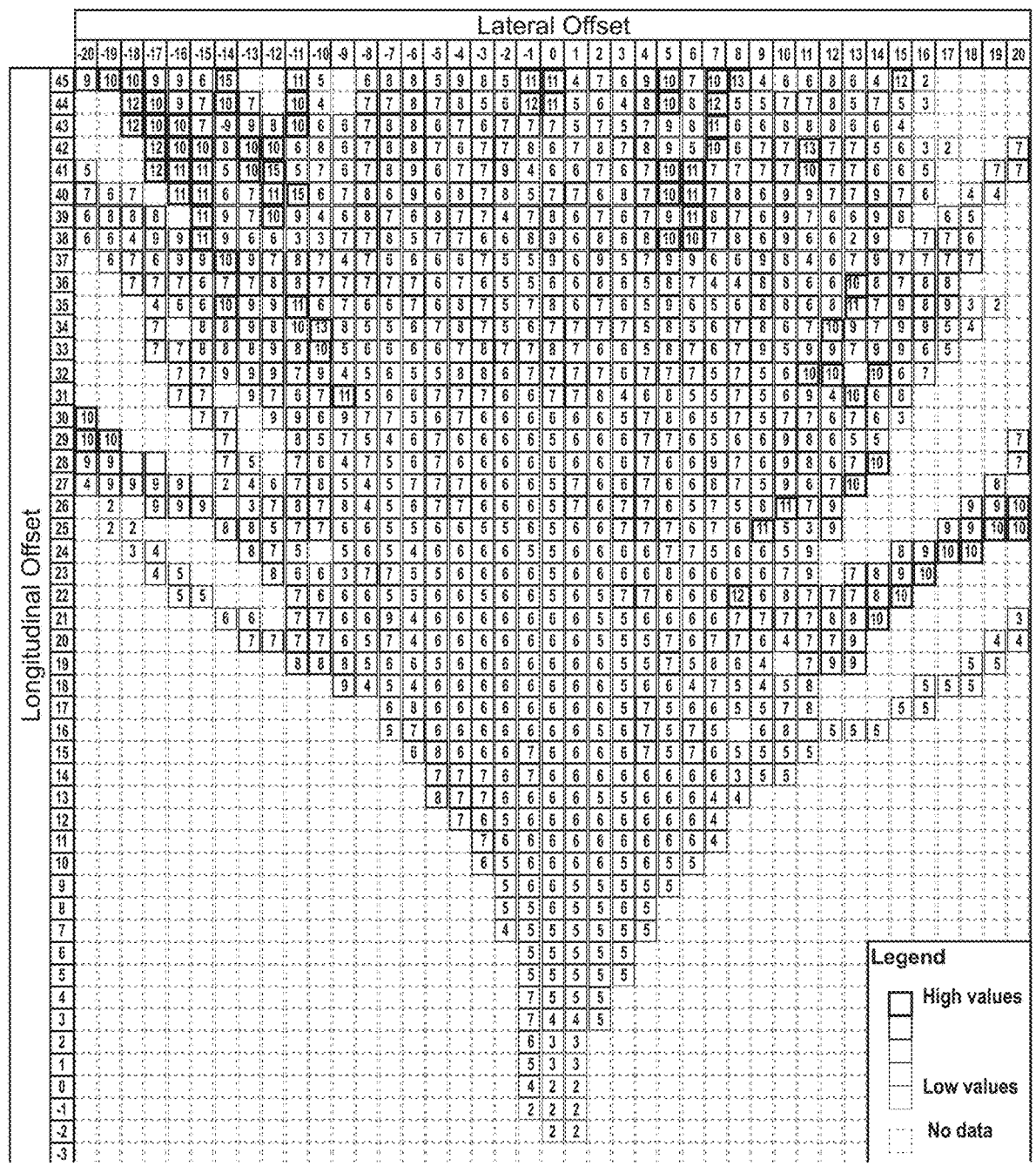
FIG. 7 is a chart illustrating raw aggregate speed values defined for different lateral offset and longitudinal offset coordinate locations defining a ROI for a loading zone, according to some embodiments.

FIGS. 6 and 7 show examples of raw aggregate data for a ROI, organized according to lateral and longitudinal offset coordinates. In particular, FIG. 6 shows a chart 600 illustrating raw aggregate heading values for coordinate-defined locations of the ROI. The horizontal axis of chart 600 corresponds to a lateral offset from the center of the loading zone. The vertical axis of chart 600 corresponds to a longitudinal offset from the center of the loading zone. The raw aggregate heading value for each respective location may correspond to an average of multiple corresponding historical heading values for that location. Each historical heading value for that location corresponds to a heading of a vehicle that was previously monitored (e.g., by the present system) as having successfully backed into a loading zone from that location, with each historical heading for that location corresponding to a respectively different instance of a vehicle backing into the loading zone. It should be noted that in some embodiments, the historical heading values may be collected from a single vehicle navigating to the loading zone of a single shovel numerous times, while in other embodiments, the historical heading values may be collected from multiple vehicles navigating to the loading zone of a single shovel numerous times, or from multiple vehicles navigating to the loading zones of multiple shovels. In some embodiments, each historical data point, when being combined with other historical data to generate the raw aggregate heading and speed data, could be weighted according to various factors including: experience of the operator associated with that historical data point, the aptitude of that operator (e.g., a quantification of how well the operator is generally able to operate the vehicle), the accuracy with which the vehicle entered the loading zone, and/or feedback regarding how well the vehicle entered the loading zone provided by the operator of the corresponding power shovel or other piece of heavy equipment. This weighting or "gamification" of historical data points when generating raw aggregate data may be beneficial in reducing or preventing skewing of the raw aggregate data from outlier conditions such as exceptionally adept or inexperienced operators or situations in which vehicles were still able to be loaded despite being significantly misaligned at the loading zone.

The "successful" navigation of a vehicle into the loading zone may be defined based on whether the vehicle reached the loading zone, the accuracy with which the vehicle entered the loading zone (e.g., based on heading and location), and/or feedback provided by the operator of the shovel with which the loading zone is associated. In some embodiments, additionally heading and speed data may also be collected from vehicles that attempted to, but did not successfully navigate into the loading zone, and this historical heading and speed data may be used to further define the aggregate heading and speed values and corresponding threshold used as the basis for determining whether to generate and provide a wave-off alert to the operator of a vehicle.

FIG. 7 shows a chart 700 illustrating raw aggregate speed values for coordinate-defined locations of the ROI. The horizontal axis of chart 700 corresponds to a lateral offset from the center of the loading zone. The vertical axis of chart 700 corresponds to a longitudinal offset from the center of the loading zone. The raw aggregate speed value for each respective location may correspond to an average of multiple corresponding historical speed values for that location. Each historical speed value for that location corresponds to a speed of a vehicle that was previously monitored (e.g., by the present system) as having successfully backed into a loading zone from that location, with each historical speed for that location corresponding to a respectively different instance of a vehicle backing into the loading zone. It should be noted that in some embodiments, the historical speed values may be collected from a single vehicle navigating to the loading zone of a single shovel numerous times, while in other embodiments, the historical speed values may be collected from multiple vehicles navigating to the loading zone of a single shovel numerous times, or from multiple vehicles navigating to the loading zones of multiple shovels.

As shown, the raw aggregate data may lack information for some coordinates, despite these coordinates being located within the ROI. Thus, it may be desirable to perform geospatial interpolation in order to smooth the raw aggregate data. Methods of geospatial interpolation that may be applied to the raw aggregate data may include nearest neighbor interpolation, inverse distance weighting (IDW), Kriging, or statistical gap-filling.

Figure 8:
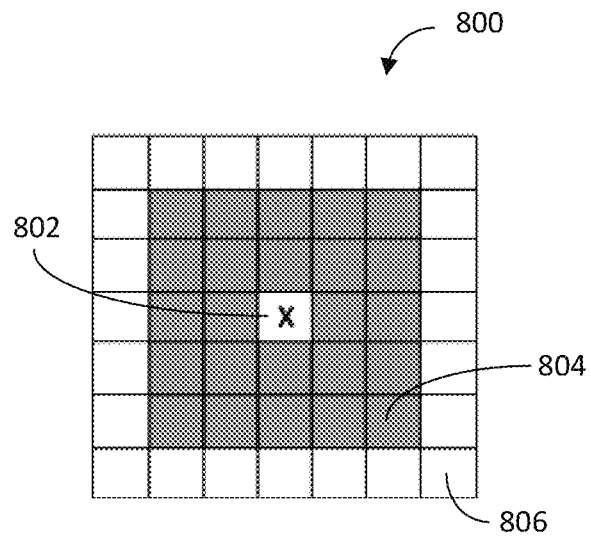
FIG. 8 shows an example variation of nearest neighbor approximation, which may be used in connection with an embodiment of the present disclosure.

FIG. 8 shows an example of a variation of nearest neighbor interpolation. As shown, cells 800 include a target cell 802, neighboring cells 804, and non-neighboring cells 806. Here, instead of setting the value of target cell 802 equal to the value of only the nearest cell, per traditional nearest neighbor methodology, the values of neighboring cells 804 are averaged together, and the value of target cell 802 may be set to the resultant averaged value. It should be noted that neighboring cells 804 are shown here as being cells within a 2-cell radius of the target cell, other radii may be used to determine neighboring cells 804 depending on the level of smoothing desired.

In context of the present system, this variation of nearest neighbor interpolation may be used to generate aggregate data based on the raw aggregate data (e.g., as shown in charts 600 and 700 of FIGS. 6 and 7). For example, aggregate heading data may be generated by calculating a value for each cell within the ROI using nearest neighbor interpolation, where the values of the nearest neighbors are derived from the raw aggregate heading data. Similarly, an array of aggregate speed data may be generated by calculating a value for each cell within the ROI using nearest neighbor interpolation, where the values of the nearest neighbors are derived from the raw aggregate speed data.

Figure 9:
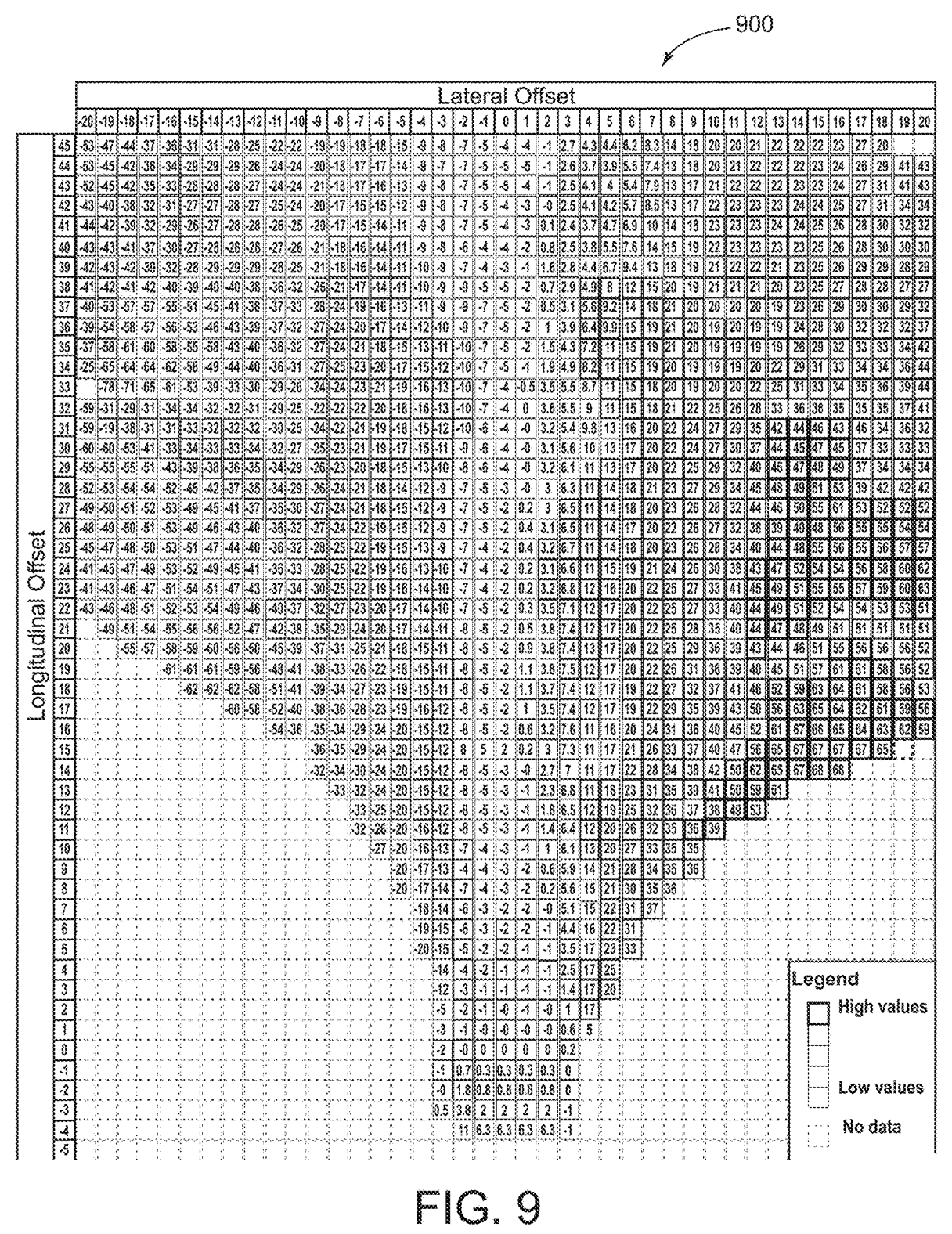

Examples of the results of applying this variation of nearest neighbor interpolation are shown in FIG. 9, which shows a chart 900 which includes aggregate heading data. This aggregate heading data is generated by applying the variation of nearest neighbor interpolation described in connection with FIG. 8 to the raw aggregate heading data shown in chart 600 of FIG. 6. It should be understood that aggregate speed data (not shown) may be generated in an analogous manner to the generation of the aggregate heading data of chart 900 by applying the variation of nearest neighbor interpolation described in connection with FIG. 8 to the raw aggregate heading data shown in chart 700 of FIG. 7. When comparing chart 600 to chart 900, it can be observed that the application of the variation of nearest neighbor interpolation results in aggregate data that is more complete, with significantly fewer instances of locations within the ROI for which no data is available. Furthermore, the smoothing effect of the variation of nearest neighbor interpolation may reduce the impact of outliers in the raw aggregate data. It should be noted that while nearest neighbor interpolation may be used to generate the aggregate heading data of the chart 900 from the raw aggregate heading data of chart 600 or to generate aggregate speed data from the raw aggregate speed data of chart 700, other interpolation and extrapolation techniques could instead be used to "fill in" data points missing from the raw aggregate heading data and the raw aggregate speed data. Such alternative interpolation and extrapolation techniques may include, for example, inverse distance weighting, kriging (or other geostatistical methods), and/or statistical gap-filling techniques.

In the present example, when it is detected that the heading and speed of a vehicle being monitored in the ROI is sufficiently different from the aggregate heading value and aggregate speed value associated with the vehicle's location within the ROI, a wave-off alert may be issued to the driver of the vehicle. This wave-off alert may, for example, be issued by a central application via wireless communication with the vehicle. In order to ensure that the operator of the vehicle is able to quickly and easily recognize and react to a wave-off alert that has been issued to the vehicle, a lighted display may be included in the cabin of the vehicle.

Figure 10:
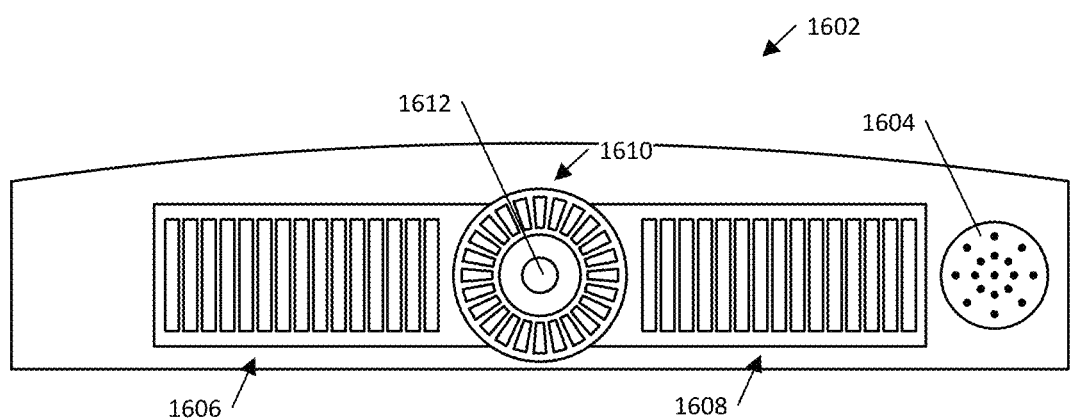
FIG. 10 depicts a display that may be mounted within a vehicle to provide feedback to an operator of a vehicle, according to some embodiments.

The display of FIG. 10 could be mounted, for example, over or near a steering wheel of a vehicle (e.g., vehicle 404, 2510, FIGS. 4, 5) enabling an operator of the vehicle to easily look towards the display to quick gather information necessary for navigating the vehicle. Display 1602 includes a number of light indicators that can be illuminated to provide the operator with information regarding the current location and heading of the vehicle with respect to a target destination (e.g., loading zone 435, 2514, FIGS. 4, 5). Display 1602 may also include a speaker 1604 that can be used to sound audible alerts for a number of situations. Example situations where an audible alarm may sound include an imminent collision with an object within the vicinity of the vehicle, a deviation of the vehicle from the designated path to such a degree that the vehicle cannot return to the path, entry of the vehicle into the target destination, issuance of a wave-off alert to the vehicle, and the like.

Display 1602 includes left and right banks of lights 1606 and 1608, respectively. These banks of lights can be used to indicate a deviation of the vehicle away from a target destination in a direction along a particular axis. For example, the deviation may be measured along an axis that runs perpendicularly through a line extending away from the target destination in a direction from which a vehicle should enter the target destination. Different numbers of either lights 1606 or 1608 may be illuminated to illustrate a magnitude of the deviation. In various other embodiments, the lights may be illuminated with different colors or intensity to show the deviation.

To determine the number of lights 1606 or 1608 to be illuminated a metric is compared against a set of ranges which determines the state of each lights 1606 or 1608. The criteria may result in illuminating a single segment or group of segments. For example, lights 1608 may be used to represent how far the vehicle is to the right of the target line, referred to as lateral offset. Lights 1608 can be configured such that any lateral offset less than 0.5 meters will not illuminate any part of lights 1608, and that any offset greater than 7.5 meters will illuminate the entirety of lights 1608. Between lateral offsets of 0.5 meters and 7.5 meters, segments of lights 1608 are illuminated for 0.5 meter intervals of lateral offset from left to right. So, for a metric of 0.7, the leftmost segment is lit. For a metric of 4.2, the leftmost six segments are lit. And so on. This logic is reversed to handle negative lateral offsets for illuminating on one or more of lights 1606.

A central ring 1610 of lights can be used to indicate the angle between the current heading of the vehicle and the angle at which the target destination should be entered. In other embodiments, central ring 1610 may be utilized to depict a desired steering wheel position for the vehicle. Accordingly, given some means for the operator to reference the actual steering wheel position (such as a tag or mark at one point on the wheel), central ring 1610 may be used to depict desired steering wheel position. Furthermore, with an appropriate vehicle model and steering sensor, this position could be linked with the desired motion of the vehicle.

In some embodiments, central ring 1610 is used to indicate the difference between the target heading and the current vehicle heading (i.e., heading offset). In the present example, central ring 1610 includes 24 segments, each representing 15 degree intervals. The uppermost segment represents a difference between target heading the current vehicle heading of 357.5 degrees to 7.5 degrees, and segments moving clockwise move up by 15 degree intervals. Unlike lights 1606 and 1608, only a single segment is active at a time, matching the heading offset, rather than a set of segments.

A central light 1612 maybe selectively illuminated when the vehicle is on target and successfully navigating along the desired path to the target destination. Accordingly, central light 1612 may be illuminated when both heading offset and lateral offset are within an acceptable threshold. For example, if the vehicle is experiencing a lateral offset of 0±0.5 m and a heading offset>359 or <1 degrees central light 1612 may be illuminated. If either of the heading offset or lateral offset are outside those boundaries, central light 1612 would not be illuminated.

In some embodiments, all of lights 1606, 1608, 1610, and 1612 may illuminate or flash to indicate that a wave-off alert has been issued to the vehicle. Although display 1602 is configured to be mounted nearby a steering wheel of the vehicle, in many cases, particularly when the vehicle is being reversed, the vehicle operator is not looking over the steering wheel and will instead be looking into either of the vehicle's two side or wing mirrors. In that case, one or more display devices can be incorporated into the vehicle's side mirrors to provide guidance and feedback to the vehicle operator as the vehicle navigates along a path to a target destination.

Figure 11:
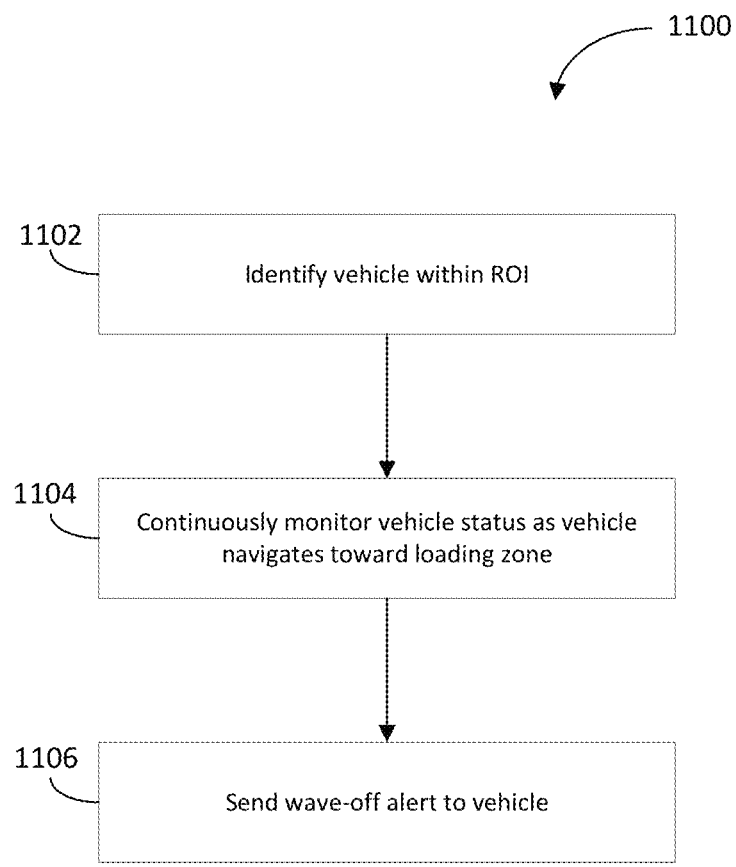
FIG. 11 depicts an illustrative flow chart of a process by which a system may identify, monitor, and send a wave-off alert to a vehicle in the ROI of a loading zone, according to some embodiments.

FIG. 11 shows an illustrative process flow chart for a method 1100 by which a vehicle in a ROI (e.g., ROI 445, 2516, FIGS. 4 and 5) of a loading zone of a piece of heavy equipment may be identified, monitored, and waived-off.

In some embodiments, the heading and speed of a vehicle identified within the ROI of a loading zone for a piece of heavy equipment may be used as the basis for determining whether a wave-off alert should be sent to the vehicle. Method 1100 may be performed by software executed by a processor located within a system (e.g., system 300, FIG. 3).

As an example, method 1100 may be performed using a centralized software application executed by a remote processor contained within a system that is in wireless communication with the vehicle. As another example, method 1100 may be performed using one or more distributed software applications being executed using multiple processors, which may include a remote processor, a processor contained within a computer system within the vehicle, and/or a processor contained within a computer system that is located wholly or in part within of a piece of heavy equipment (e.g., power shovel 105, 225, 405, 2504, FIGS. 1, 2, 4, 5).

At step 1102, the system may identify a vehicle within the ROI as being of interest. For example, the system may identify the vehicle in the ROI as being of interest in response to determining that the vehicle has a heading and a speed that are within respectively acceptable ranges, given the vehicle's location. The acceptable range for the heading may be defined as the aggregate heading value for the vehicle's location, plus or minus a predetermined heading threshold value. The acceptable range for the speed may be defined as the aggregate speed value for the vehicle's location, plus or minus a predetermined speed threshold value. In some embodiments, the predetermined speed threshold value and the predetermined heading threshold value may be dynamic values that are defined, respectively, as a percentage of the aggregate speed value, and a percentage of the aggregate heading value. As described previously, the aggregate heading value and aggregate speed value for the vehicle's location may be stored in a database (e.g., configuration database 310, FIG. 3) in a non-transitory computer-readable memory of the system as part of a set of aggregate data. The predetermined speed threshold value and the predetermined heading threshold value may also be stored in this database. Because the aggregate speed value and aggregate heading value are generated based on the headings and speeds of vehicles that previously navigated into the loading zone within an acceptable degree of accuracy, these factors may be used as a predictive basis for identifying a vehicle that may intend to enter the loading zone.

As another example, the system may identify a vehicle in the ROI as being of interest in response to determining that the vehicle has selected the loading zone as its specified target destination. For example, the system may maintain a target destination database (e.g., a look-up table) in a non-transitory computer readable memory, the target destination database containing the target destination of each vehicle connected to the system through the communications network. This target destination database may be updated periodically to ensure that changes in the target destinations of vehicles tracked by the database may be identified within a reasonable amount of time. The system may use the location of a vehicle in conjunction with the target destination of the vehicle to identify that the vehicle is within the ROI of the loading zone and has selected the loading zone as a target destination.

As another example, the system may identify the vehicle as being of interest in response to determining that the vehicle is within the ROI and that, based on a predefined turning radius of the vehicle, the vehicle is physically capable of navigating directly into the loading zone (e.g., without having to reverse direction of the vehicle in order to realign the vehicle and/or without hitting identified obstacles, such as a power shovel).

At step 1104, the system may continuously, or intermittently, monitor the status of the vehicle as the vehicle navigates toward the loading zone. Here, "continuously monitor" may be defined as sampling status information from the vehicle periodically with a predetermined frequency. This status information may include heading, speed, location, bearing, selected target destination, or any other status information that may be pertinent to determining the projected course of the vehicle. The status information, may, for example, be collected for analysis via wireless communication between an on-board computer system of the vehicle and an external computer system which may, for example, be at least partially implemented with a piece of heavy equipment associated with the loading zone.

While monitoring the status or movement of the vehicle, the system may use any suitable approach for determining whether the vehicle is on course to accurately navigate into the loading zone. This may involve, for example, the system monitoring vehicle dynamics, such as turning radius and stopping distance and periodically making a determination as to whether the vehicle is physically capable of navigating into the loading zone. In the example of turning radius, the system may determine that the turning radius of the vehicle is outside of an acceptable range (e.g., where the acceptable range may be dynamically updated as the vehicle navigates toward the loading zone, based on one or more predictions of the turning radius required for maneuvering the vehicle into the loading zone) and may issue a wave-off alert in response. In still other embodiments, the system may analyze historical vehicle movement data (e.g., position and speed data for numerous vehicles) that have each successfully navigated into the loading zone. Using that data, the system may determine reasonable thresholds for speed and orientation in different parts of the ROI. If, for the present vehicle, the vehicle's speed or orientation falls outside the thresholds determined based upon successful historical navigations into the loading zone, the system may determine that the vehicle is incapable of navigating successfully into the loading zone.

In still other embodiments, a machine learning engine (MLE) may be trained using historical navigation data of other vehicles navigating into the loading zone to identify or determine whether a present vehicle attempting to navigate into the loading zone will do so successfully. In such an implementation, the training data used to train the MLE may include vehicle positional and speed data for a number of different vehicles, as well as an indication of whether the outcome of that vehicle's particular maneuver was successful or unsuccessful. Using such a training data set, the MLE can be trained to make a determination as to whether the present vehicle will navigate successfully.

At step 1106, in response to determining that the vehicle is no longer on course to accurately navigate into the loading zone, the system may send a wave-off alert to the vehicle. This determination may be made based on the status information collected while monitoring the vehicle in step 1104. The wave-off alert may instruct the operator of the vehicle to guide the vehicle out of the ROI. In some embodiments, instead of this instruction, or in combination with this instruction, the wave-off alert may cause an HMI that has been providing guidance to the operator of the vehicle into the loading zone to cease providing this guidance and to provide an indicator to the operator that the guidance has ceased.

Figure 12:
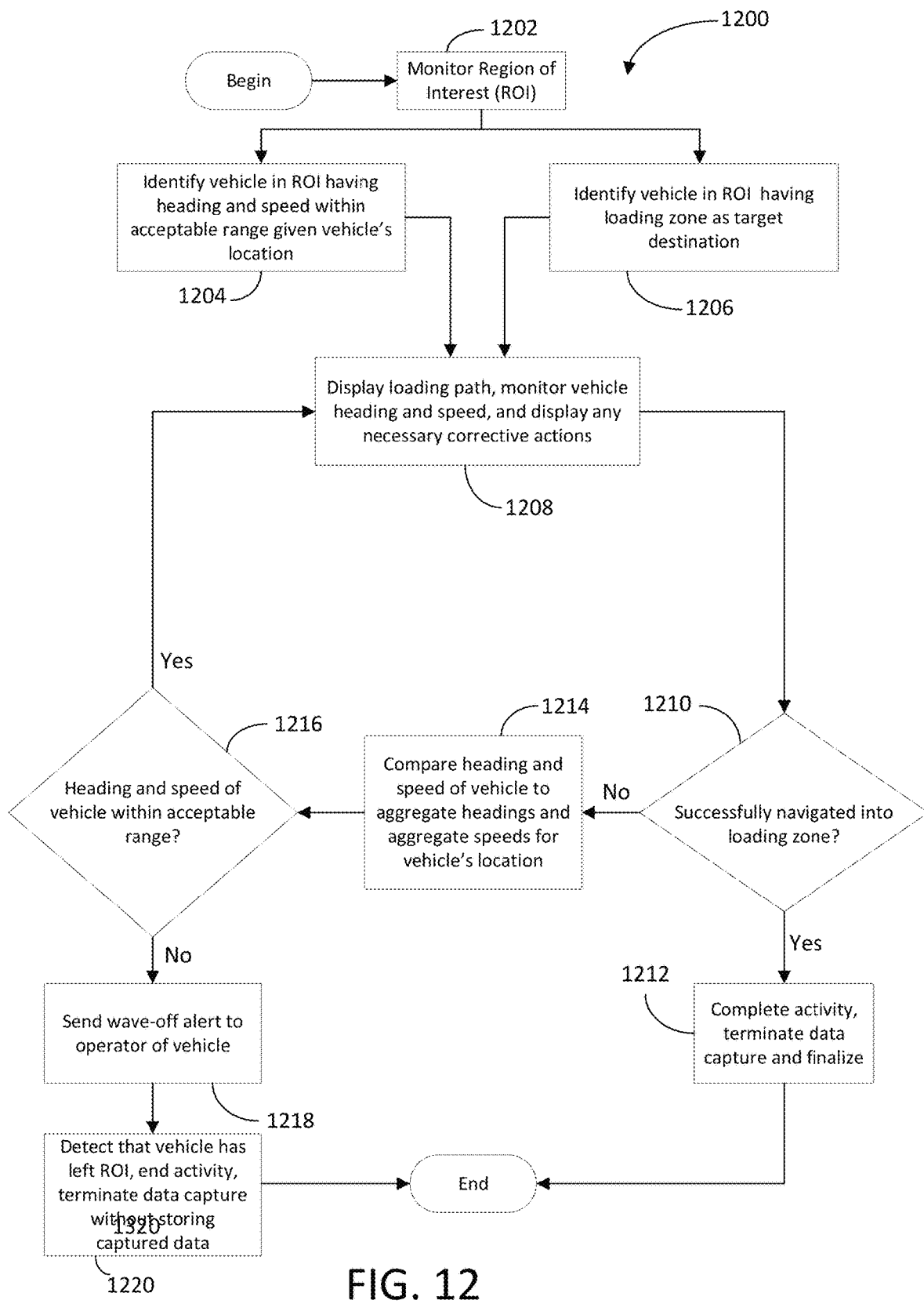
FIG. 12 depicts an illustrative flow chart of a process by which a system may identify, monitor, and send a wave-off alert to a vehicle in the ROI of a loading zone based on the heading and speed of the vehicle, according to some embodiments.

FIG. 12 shows an illustrative process flow chart for a method 1200 by which a vehicle in a ROI (e.g., ROI 445, 2516, FIGS. 4 and 5) of a loading zone may be identified and automatically guided into the loading zone (e.g., loading zone 435, 2514 FIGS. 4 and 5), with a wave-off alert potentially being sent to the vehicle if the speed and heading of the vehicle are detected to have fallen outside of a predefined acceptable range. Method 1200 may be an example of a particular application of the method 1100 shown in FIG. 11. Method 1200 may be performed by software executed by a processor located within a system (e.g., system 300, FIG. 3). As an example, method 1200 may be performed using a centralized software application executed by a remote processor contained within a system that is in wireless communication with the vehicle. As another example, method 1200 may be performed using one or more distributed software applications being executed using multiple processors, which may include a remote processor, a processor contained within a computer system within the vehicle, and/or a processor contained within a computer system that is located wholly or in part within of a piece of heavy equipment (e.g., power shovel 105, 225, 405, 2504, FIGS. 1, 2, 4, 5).

At step 1202, the system monitors the ROI for the loading zone in order to identify vehicles that may intend to enter the loading zone (e.g., by monitoring location, speed, and heading data and target destinations for some or all vehicles connected to the system via a communications network such as communications network 230a, 230b, 240, FIG. 2).

At step 1204, the system may identify a vehicle in the ROI as having a heading and a speed that are within respectively acceptable ranges, given the vehicle's location. The acceptable range for the heading may be defined as the aggregate heading value for the vehicle's location, plus or minus a predetermined heading threshold value. The acceptable range for the speed may be defined as the aggregate speed value for the vehicle's location, plus or minus a predetermined speed threshold value. In some embodiments, the predetermined speed threshold value and the predetermined heading threshold value may be dynamic values that are defined, respectively, as a percentage of the aggregate speed value, and a percentage of the aggregate heading value. These dynamic values may change as the aggregate speed value and aggregate heading value for a particular location changes. In some embodiments, a set of upper and lower predetermined speed threshold values and a set of upper and lower predetermined heading threshold values may instead be used, as it may be appropriate to set asymmetrical thresholds when navigating a vehicle to a loading zone from certain locations or in certain conditions (e.g., inclement weather conditions or conditions in which obstacles such as rocks or uneven ground are present in the ROI). In some embodiments, the respective ranges of the predetermined speed threshold value(s) and predetermined heading threshold value(s) may increase (e.g., linearly, logarithmically, geometrically, exponentially, etc.) with distance from the loading zone (e.g., from the center of the loading zone). As described previously, the aggregate heading value and aggregate speed value for the vehicle's location may be stored in a database (e.g., configuration database 310, FIG. 3) in a non-transitory computer-readable memory of the system as part of a set of aggregate data. The predetermined speed threshold value and the predetermined heading threshold value may also be stored in this database. Because the aggregate speed value and aggregate heading value are generated based on the headings and speeds of vehicles that previously navigated into the loading zone within an acceptable degree of accuracy, these factors may be used as a predictive basis for identifying a vehicle that may intend to enter the loading zone.

Alternatively, at step 1206 the system may identify a vehicle in the ROI as having the loading zone as its specified target destination. For example, the system may maintain a target destination database (e.g., a look-up table) in a non-transitory computer readable memory, the target destination database containing the target destination of each vehicle connected to the system through the communications network. This target destination database may be updated periodically to ensure that changes in the target destinations of vehicles tracked by the database may be identified within a reasonable amount of time. The system may use the location of a vehicle in conjunction with the target destination of the vehicle to identify that the vehicle is within the ROI of the loading zone and has selected the loading zone as a target destination.

At step 1208, a loading path (e.g., a path from the identified vehicle's current location to the loading zone) may be displayed on a display/screen (e.g., screen 320, FIG. 3) of the vehicle. The identified vehicle's speed and heading may be monitored by the system and any necessary corrective actions may be displayed on the screen as well. For example, the heading and/or speed of the vehicle may be detected as trending away from the aggregate speed or aggregate heading for its location, while remaining within the acceptable range(s) for heading and/or speed (e.g., as defined by the predetermined heading and speed threshold values). This may be assessed by calculating (e.g., with a processor in the system) and tracking a heading error value and a speed error value for the vehicle over time. The heading error value may be calculated as the difference between the vehicle's heading and the aggregate heading value for the vehicle's current location. The speed error value may be calculated as the difference between the vehicle's speed and the aggregate speed value for the vehicle's current location. The magnitude of the speed/heading error and the rate of change of the magnitude of the speed/heading error may be monitored by the system and, if either the magnitude the rate of change of the error exceed one or more predetermined error thresholds or error rate of change thresholds, an alert may be provided to the operator indicating that the vehicle is in danger of exiting the acceptable range(s) for heading and/or for speed for its current location, and possible corrective actions may be displayed to the operator for reducing the error and keeping the vehicle within the acceptable range(s) for heading and/or speed.

The system may also capture heading and speed data for the identified vehicle during this step so that, if the vehicle successfully navigates to the loading zone, the captured heading and speed data for each location through which the vehicle traveled may be added to historical heading and speed data stored in a database of the system, and the aggregate heading and speed data (e.g., which is calculated based on the historical heading and speed data) may be subsequently updated.

At step 1210, the system may determine whether the identified vehicle has successfully navigated into the loading zone. Here, a vehicle may be considered to have "successfully" navigated into the loading zone when the vehicle reaches the loading zone, when the accuracy with which the vehicle has entered the loading zone (e.g., based on heading and location) is within a predefined threshold, and/or when feedback provided by the operator of the shovel with which the loading zone is associated confirms the vehicle's successful navigation. For example, the system may assess the heading and location of the vehicle in order to determine whether the vehicle is accurately within the loading zone. In the present example, the system may calculate that a location difference value defined as the difference between the location of the center of the vehicle and the location of the center of the loading zone, and may calculate a heading difference value defined as the difference between the heading of the vehicle and the heading of the loading zone (e.g., with each heading defined with respect to true or magnetic North). If the location difference value is less than a predetermined location difference threshold and/or the heading difference value is less than a predetermined heading difference threshold, the system may determine that the vehicle has successfully navigated into the loading zone. Otherwise, if the location difference value exceeds the predetermined location difference threshold and/or the heading difference value exceeds the predetermined heading difference threshold, the system may determine that the vehicle has not successfully navigated into the loading zone.

If the vehicle successfully navigated into the loading zone, method 1300 proceeds to step 1212 and the activity (e.g., entering the loading zone) is determined to be complete. At this stage, the capture of heading and speed data for the vehicle is stopped and finalized, and the heading and speed data is added to the historical data in the database of the system.

Otherwise, if the vehicle has not successfully navigated into the loading zone, method 1200 proceeds to step 1214.

At step 1214, the location, heading, and speed of the vehicle may be detected, and the heading and speed of the vehicle are compared to the aggregate heading value and the aggregate speed value for the vehicle's current location.

At step 1216, based on this comparison and based on the location of the vehicle, it may be determined whether the heading and speed of the vehicle are within the acceptable range, and whether the vehicle remains inside the ROI for the loading zone. If each of these conditions is true, method 1200 returns to step 1208. Otherwise, if any of these conditions is false, a wave-off alert may be provided to the operator of the vehicle at step 1218.

At step 1218 the system sends a wave-off alert to the operator of the vehicle, indicating that the operator should navigate the vehicle out of the ROI and, if desired, re-align the vehicle in order to better position the vehicle for accurately entering the loading zone. The wave-off alert may be provided to the operator via an HMI within the vehicle, such as a user interface of a display (e.g., interface 324, screen 320, FIG. 3) or may be provided via a speaker (e.g., speaker 318, FIG. 3), or any other appropriate device through which an alert may be provided to the operator.

At step 1220, the system detects that the vehicle has left the ROI in response to the wave-off alert, and the activity is ended. At this stage, data capture is also terminated without the captured heading and speed data being added to the historical data of the system's database, as the captured data now corresponds to an unsuccessful attempt at entering the loading zone.

Figure 13:
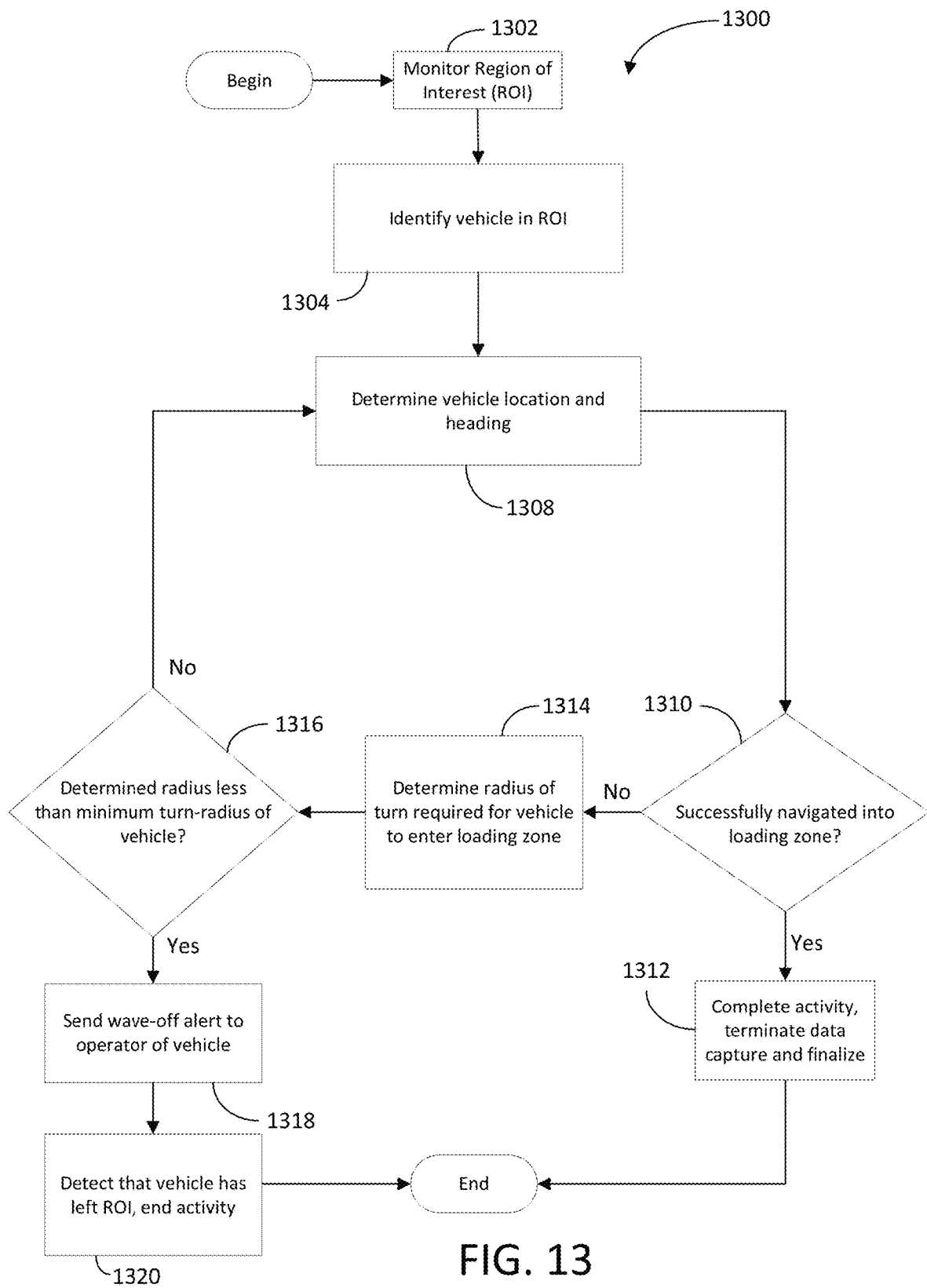
FIG. 13 depicts an illustrative flow chart of a process by which a system may identify, monitor, and send a wave-off alert to a vehicle in the ROI of a loading zone based on a minimum turn-radius of the vehicle, according to some embodiments.

FIG. 13 shows an illustrative process flow chart for a method 1300 by which a vehicle in a ROI (e.g., ROI 445, 2516, FIGS. 4 and 5) of a loading zone may be identified and automatically guided into the loading zone (e.g., loading zone 435, 2514 FIGS. 4 and 5), with a wave-off alert potentially being sent to the vehicle if it is detected that the vehicle is physically unable to maneuver into the loading zone without reversing direction and/or realigning. Method 1300 may be an example of a particular application of the method 1100 shown in FIG. 11. Method 1300 may be performed by software executed by a processor located within a system (e.g., system 300, FIG. 3). As an example, method 1300 may be performed using a centralized software application executed by a remote processor contained within a system that is in wireless communication with the vehicle.

As another example, method 1300 may be performed using one or more distributed software applications being executed using multiple processors, which may include a remote processor, a processor contained within a computer system within the vehicle, and/or a processor contained within a computer system that is located wholly or in part within of a piece of heavy equipment (e.g., power shovel 105, 225, 405, 2504, FIGS. 1, 2, 4, 5).

At step 1302, the system monitors the ROI for the loading zone in order to identify vehicles that may intend to enter the loading zone (e.g., by monitoring location, speed, and heading data and target destinations for some or all vehicles connected to the system via a communications network such as communications network 230*a*, 230*b*, 240, FIG. 2).

At step 1304, the system may identify a vehicle in the ROI based on the vehicle's location. In some embodiments, the vehicle may be identified based on factors other than location, which may be predictive of the operator of the vehicle's intention to enter the loading zone. Such factors may include heading, speed, location, bearing, and/or selected target destination of the vehicle.

At step 1308, the identified vehicle's location and heading may be monitored by the system. For example, heading and location data for the vehicle may be determined using a Global Navigation Satellite System (GNSS), such as a global positioning system (GPS), where one or more GNSS/GPS receivers in the vehicle are used to determine the location and heading of the vehicle.

At step 1310, the system may determine whether the identified vehicle has successfully navigated into the loading zone. Here, a vehicle may be considered to have "successfully" navigated into the loading zone when the vehicle reaches the loading zone, when the accuracy with which the vehicle has entered the loading zone (e.g., based on heading and location) is within a predefined threshold, and/or when feedback provided by the operator of the shovel with which the loading zone is associated confirms the vehicle's successful navigation.

If the vehicle successfully navigated into the loading zone, method 1300 proceeds to step 1312 and the activity (e.g., entering the loading zone) is determined to be complete.

Otherwise, if the vehicle has not successfully navigated into the loading zone, method 1300 proceeds to step 1314.

At step 1314, the system determines the radius of a turn that would be required for the vehicle to successfully enter the loading zone based at least on the vehicle's speed, heading, and location. Depending on the value of the determined radius, it may be inefficient or impossible for the vehicle to navigate into the loading zone without needing to change direction to realign the vehicle.

At step 1316, the system compares the determined radius to a minimum turn-radius of the vehicle. The turn radius of the vehicle may, for example, be retrieved from a look-up table (LUT) containing predefined minimum turn radii for different vehicle types under various conditions. Here, the term "minimum turn-radius" may be defined as a predefined minimum turn radius for the vehicle given a set of conditions, which may include one or more of the speed of the vehicle, the age of the vehicle, and environmental conditions. This predefined minimum turn radius, for example, may be defined based on the lowest feasible (e.g., safe and/or efficacious) turn radius the vehicle may achieve given the set of conditions. The predefined minimum turn-radius for the vehicle therefore may not necessarily be the absolute minimum mechanical turn-radius of the vehicle, but may instead be a minimum turn-radius for the vehicle that is determined to be safe given the above conditions. The LUT may be stored in a memory device of the system, or may be stored in a remote database that is in electronic communication with the system. If the determined radius is not less than the predefined minimum turn-radius, method 1300 returns to step 1308. Otherwise, if the determined radius is less than the predefined minimum turn radius, a wave-off alert may be provided to the operator of the vehicle at step 1318.

At step 1318, the system sends a wave-off alert to the operator of the vehicle, indicating that the operator should navigate the vehicle out of the ROI and, if desired, re-align the vehicle in order to better position the vehicle for accurately entering the loading zone. The wave-off alert may be provided to the operator via an HMI within the vehicle, such as a user interface of a display (e.g., interface 324, screen 320, FIG. 3) or may be provided via a speaker (e.g., speaker 318, FIG. 3), or any other appropriate device through which an alert may be provided to the operator.

At step 1320, the system detects that the vehicle has left the ROI in response to the wave-off alert, and the activity is ended.

Figure 14:
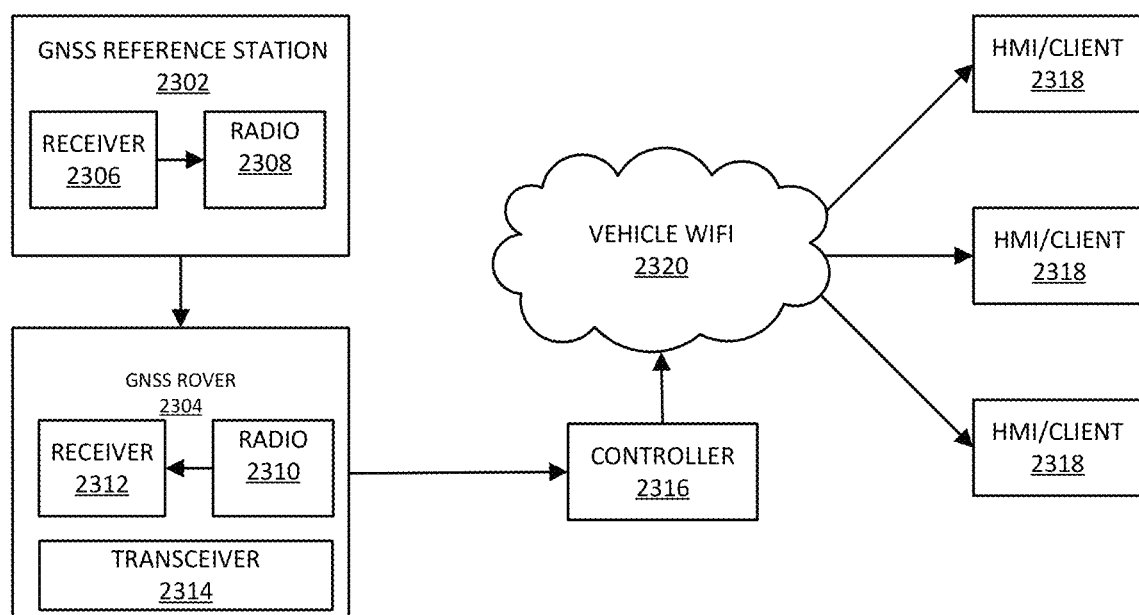
FIG. 14 is a block diagram illustrating functional components of a Global Navigation Satellite System (GNSS) which may determine the time-varying location of one or more vehicles, according to some embodiments.

In FIG. 14, the present system's utilization of a combination of one or more Global Navigation Satellite System (GNSS) reference stations 2302 and one or more GNSS rovers 2304 to provide accurate location data within a particular environment, such as a mining environment, is shown. In this implementation, GNSS reference station 2302 is positioned at a well-known location within the environment. The location of GNSS reference station 2302 can be accurately determined using any suitable technique, such as geodetic survey (referencing a known datum), or averaging observed position over an extended period of time.

GNSS reference station 2302 includes receiver 2306 configured to receive one or more externally-generated signal (e.g., a radio frequency (RF) signal) providing GNSS reference station 2302 with its location data. GNSS reference station 2302 also include radio 2308 configured to broadcast the location information for GNSS reference station 2302 using a known protocol. This enables GNSS reference station 2302 to operate as a beacon, continuous, or intermittent, broadcasting its own well-known location data.

GNSS rover 2304 includes radio 2310 and received 2312 configured to receive and decode the beacon signals of one or more GNSS reference station 2302 positioned about the environment. GNSS rover 2304 can then analyze one or more of the beacon signals received via radio 2310 to determine an accurate location and orientation of GNSS rover 2304.

In various embodiments, GNSS rover 2304 may be mounted to the vehicle being navigated (e.g., a haul truck within a mine environment) so that once an accurate location and heading are determined for GNSS rover 2304, the location and heading of the vehicle can be inferred.

GNSS rover 2304 includes transceiver 2314. Transceiver 2314 is configured to communicate (via both transmission and reception) data with one or more components that may be mounted to the vehicle. In some embodiments, transceiver 2314 may be configured to implement a relatively low-power short range communication protocol, such as BLUETOOTH. But in other embodiments, any suitable data communication protocol or technology, including both wired and wireless approaches, may be utilized.

Using transceiver 2314, GNSS rover 2304 is configured to transmit its location data to controller 2316, which is also located on or in the vehicle. In various embodiments, controller 2316 may be a mobile computing device, such as a laptop or tablet device. Controller 2316 may or may not provide a display screen or other user interface devices. Controller 2316 is configured to receive the location data from GNSS rover 2304. Controller 2316 may also be configured to access one or more database storing positional and other attribute data for a number of entities within the environment. An example of such a database includes distributed objects database 304, described above. Controller 2316 is then configured to determine a target destination or target region for the vehicle. As discussed above, this determination may involve analysis of the location, activity, and status for a number of vehicles, systems, and other objects within the environment. The target destination or space may be determined based upon attempts to optimize the activities and/or location of the vehicle and may be determined by the current location and activity of one or more other vehicles within the environment. In some cases, an operator of the vehicle may select or designate a particular target destination or region. In other cases, an operator of a remote vehicle or system (or an individual or system overseeing the environment) may select or designate a particular target destination or region.

After a suitable target destination or region is identified, controller 2316 analyzes both the location and orientation of the vehicle as well as the location of the target destination or region (e.g., loading zone). Controller 2316 can then calculate or determine a path or route that the vehicle can navigate to get to the target destination or region. As discussed above, the path may represent one or more points that the vehicle can navigate along to reach the target destination or region. The path may be linear or curvilinear in that the path may be determined by geometrical analysis of the location and heading of the vehicle to the target destination or region. In other cases, the path may be more complicated, calling for the vehicle to navigate about one or more hazards, other vehicles, objects, and the like, that may be positioned between the vehicle and the target destination or region.

Once determined, controller 2316 can cause feedback to be provided to the vehicle operator (either human or autonomous) in order to assist or facilitate the vehicle navigating to the target destination or region. The feedback can inform the operator as to the location of the vehicle with respect to the target destination or region. This may include both locational and heading or orientation feedback enabling the operator to correct any problems as the vehicle is navigated to the target destination or region. In various embodiments, the feedback can also provide instruction to the operator as to how the vehicle's steering wheel should be positioned. As the vehicle navigates towards the target destination or region, the steering information can be updated enabling the operator to proceed along an appropriate path. In some embodiments, the feedback may include graphical representations that show the location of the vehicle with respect to the target destination or region. The visual depiction may include one or more representations showing a suitable path that the vehicle may take to reach the target destination or region. The visual representations may also show other objects (e.g., hazards, vehicles, systems, etc.) that are located about the vehicle.

With reference to FIG. 14, the feedback can be provided via one or more human/machine interfaces 2318. The human/machine interfaces 2318 may be configured to communicate with controller 2316 via any suitable communication mechanism or network. In the embodiment shown in FIG. 14, a wireless network 2320 is installed within or about the vehicle to enable communication of data and information between controller 2316 and human/machine interfaces 2318.

Figure 15:
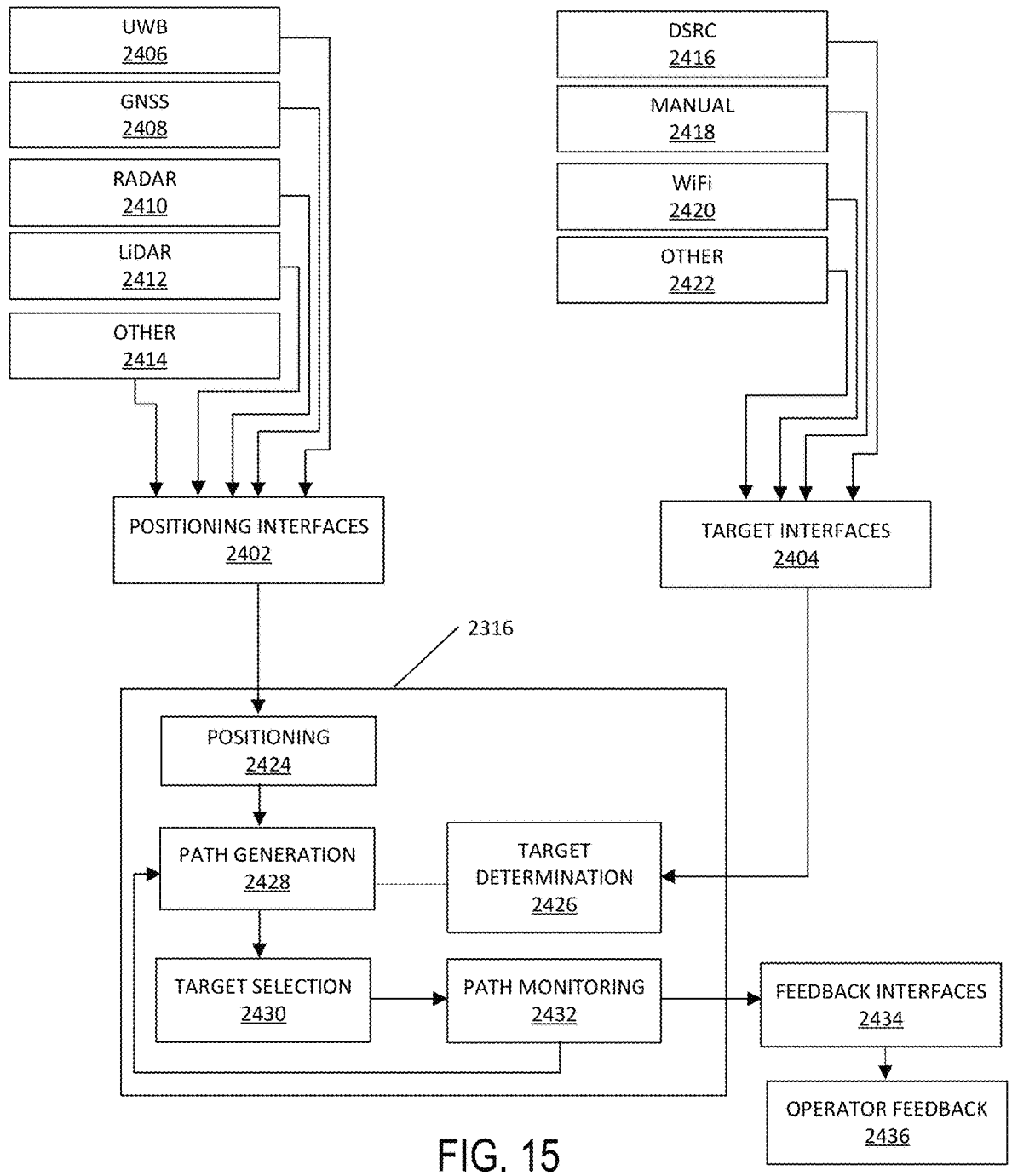
FIG. 15 is a block diagram illustrating functional components which may determine a target destination or region for a vehicle, according to some embodiments.

FIG. 15 is a block diagram illustrating functional components of controller 2316 enabling the controller to determine a suitable target destination or region for the vehicle and calculate an offset of the vehicle's current orientation and location. Controller 2316 includes two primary interfaces. Positioning interface 2402 is configured to receive positional or location data from a number of different sources. Target interface 2404 is configured to receive data from a number of sources that may be utilized to identify the target destination or region for the vehicle.

Positioning interface 2402 is configured to receive location data from a number of different sources including ultra wide band transmissions 2406, GNSS systems 2408, RADAR devices 2410, LiDAR 2412, and other systems 2414. Positioning module 2424 of controller 2316 is then configured to accumulate all data received via positioning interface 2402 to determine a location of the vehicle. This may involve, for example, combining some of the positional data together to determine the location. In some cases, some of the location data may be ignored and only utilized if one or more of the other location determining systems should fail or be unavailable.

In alternative embodiments, however, absolute position of the vehicle may not be required. Instead, systems like ultra-wide band, RADAR and LiDAR may give accurate relative position data (e.g., with respect to a target destination), not absolute global positions. If the vehicle can be positioned accurately relative to the shovel or target destination, and a target loading location is determined relative to the shovel, a guidance system can operate to guide the vehicle even without absolute vehicle position data.

Target interface 2404 pulls data from various sources including dedicated short-range communication (DSRC) interface 2416, which may provide adjacent vehicles with position, orientation and trajectory information about nearby vehicles, manual selection 2418 (e.g., either by the vehicle operator, an operator of another vehicle within the environment, or a manager of the environment), wireless data connections 2420, and other systems 2422. The data accumulated by target interface 2404 can then be analyzed by target determination module 2426 of controller 2316 to determine a suitable target destinations or regions for the vehicle.

After the vehicle's location is determined by positioning module 2424 and potential target destinations or regions are identified by target determination module 2426, controller 2316 executes a control loop including path generation module 2428, which is configured to calculate a path or trajectory to the target identified by target determination module 2426, target selection module 2430 which selects one of the target destinations or regions identified by target determination module 2426 as the vehicle' target, and path monitoring module 2432, which is configured to monitor the progress along the path calculated or determined by path generation module 2428. If path monitoring module 2432 should determine that the vehicle has deviated from the determined path, path generation module 2428 may be configured to calculate a new path. When selecting a target destination or region, target selection module 2430 may distinguish between multiple target destinations that are in close proximity. For example, a shovel may load trucks on both sides, or a crusher may have multiple bays. It is possible then that multiple target destinations meet the criteria to trigger driver feedback, and so a single target destination must be selected. As such, target selection module 2430 selects a particular target destination for the purpose of providing feedback. The selection process could consider a combination of operational rules, such as "Crusher A over Crusher B when available", safety rules, such as "Left shovel load location first" (e.g., to provider improved vehicle visibility when spotting), and efficiency rules, such as "shortest path" or "straightest path".

Path monitoring module 2432 may provide some output to one or more feedback interfaces 2434 that are coupled to one or more operator feedback devices 2436. As discussed above, operator feedback devices 2436 may include human/machine interfaces (e.g., display screens, illuminated lights, audible alarms, and the like) that may be utilized in conjunction to inform a vehicle operator of the vehicle's current location and heading with respect to a target destination or region and information informing the operator of how to steer or otherwise maneuver the vehicle to the target destination.

In the present system and method, the offset (both in location and heading) for a vehicle from a target loading location can be determined according to the following algorithm. The algorithm could be executed, for example, by controllers operating on each vehicle or piece of equipment as described below. In some embodiments, portions of the algorithm may be executed by controller 2316 described above or any other controller or processor on the vehicle.

As provided herein, the system may identify a vehicle within the ROI as being of interest. For example, the system may identify the vehicle in the ROI as being of interest in response to determining that the vehicle has a heading and a speed that are within respectively acceptable ranges, given the vehicle's location. In response, a target loading zone, or load location, may be determined manually through accepting inputs regarding a user selected loading zone as an intended target destination for the vehicle and/or through one or more components of the present system. In various examples, the loading zone may be updated based on vehicle kinematics as the vehicle approaches the loading path from a first loading zone to a second loading zone.

For instance, in some embodiments, such as the examples illustrated in FIGS. 16-20, a first loading zone 2602 may be provided to the vehicle 2510 that is along a loading path 2604 having a radius that is equal to the loading radius $S_r$ of the power shovel 2504. The location of the shovel could be determined using any suitable geolocation technology, as described herein. As provided herein, the loading zone 2602 may be defined as a position and/or a region in which the vehicle aligns with the bucket or load 2508 of the power shovel 2504. In some examples, the bucket 25808 is rotatably mounted to the power shovel 2504 causing a circular loading path 2604. However, in other examples, the bucket 2508 may be attached to the power shovel 2504 in any other manner. Accordingly, the loading path 2604 may be of any shape and/or trajectory without departing from the teachings provided herein.

Once the first loading zone 2602 is determined, the system may determine and/or provide positioning instructions to the vehicle 2510 or to an output device to assist an operator of the vehicle 2510 in moving the vehicle 2510 towards the first loading zone 2602. As provided herein, the first loading zone 2602 may be determined either through use of one or more components of the system and/or manually inputted, such as by providing inputs to the HMI within the vehicle 2510. In examples in which or more components of the system determine a loading zone 2602 along the loading path 2604, the location of the loading zone 2602 can be determined based on one or more preferences. For example, the location of the loading zone 2602 may be based on the shortest rotational path of the shovel to reduce rotational times, the position that a vehicle 2510 can reach along the loading path in the quickest time, the easiest path for the vehicle to approach and/or exit along, and/or any of preferential locations.

In operation, a vehicle may approach a ROI proximate to the target loading zone and/or a loading path. Once the vehicle is at least partially within the ROI, or as the vehicle approaches the ROI, the system and/or the HMI may provide the vehicle with instructions to position the vehicle in any identifiable position. In addition, the system can determine the vehicle coordinates, the vehicle heading, and an inverse vehicle heading to determine a vehicle vector. In some examples, once the inverse heading intersects the loading path, a first loading zone may be determined. To determine the first loading zone, an intersection point of the reverse heading and the loading path is determined. Next, a tangent vector that is normal to the loading radius originating from the intersection point is determined. Based on the heading of the vehicle and the tangent vector, a heading of a target vector may be determined. The first loading zone may be defined as a position along the loading path in which the heading of the first target vector is normal to the loading radius of the loading path. Then, vehicle offset positions are calculated and instructions are fed to a feedback mechanism to provide instructions for an operator to approach the first loading zone. As the operator approaches the first loading zone, a second loading zone may be calculated and provided to the operator of the vehicle. The second loading zone may be based on updated vehicle kinematics. The updating of the loading zones may provide various benefits, such as providing a more accessible location for the vehicle, providing an expedited approach for the vehicle, providing a more accessible location for a shovel to interface with the vehicle, and so on.

Figure 16:
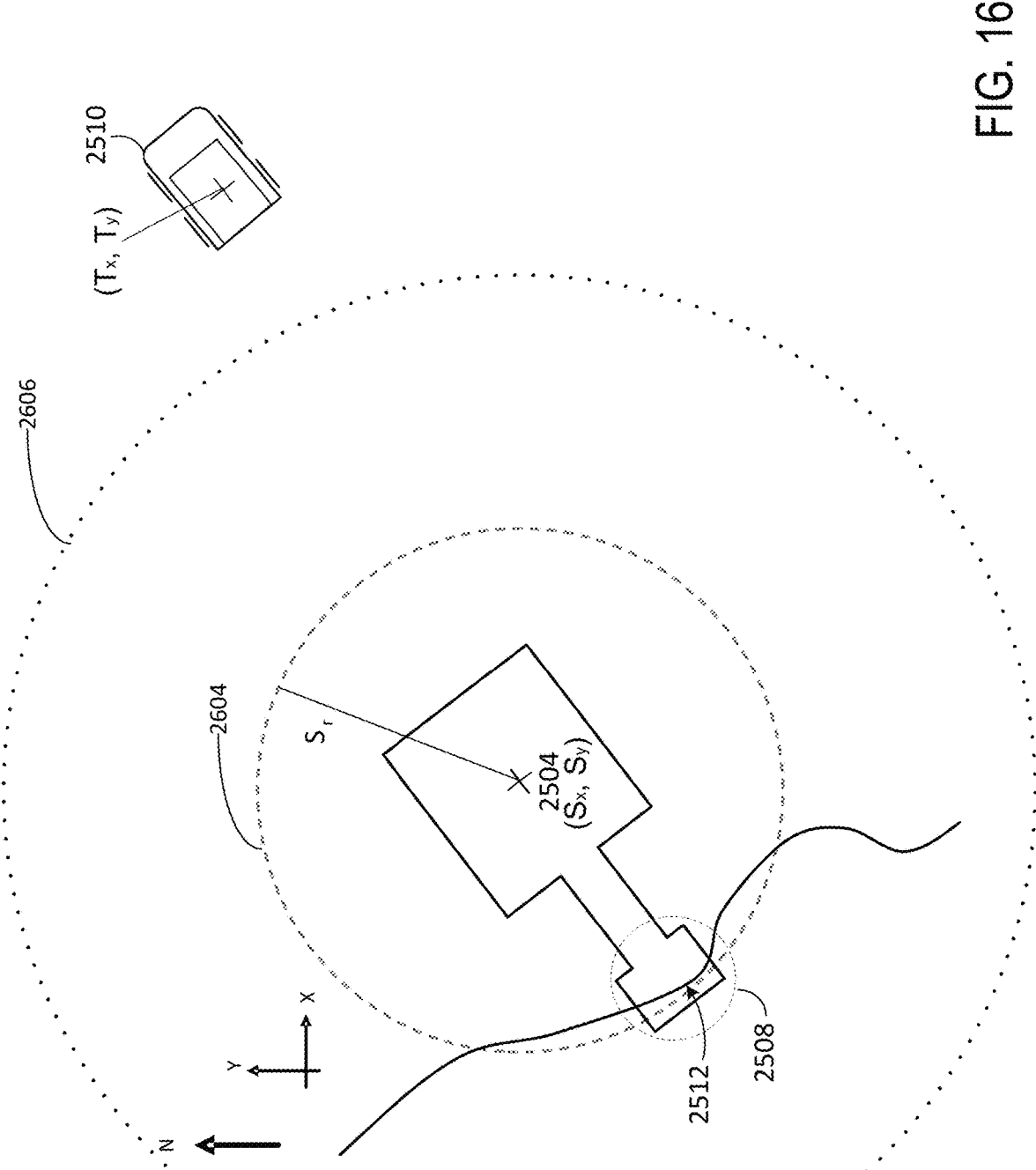
FIG. 16 is a schematic illustrating an offset of a vehicle from a loading path, according to some embodiments.
Figure 17:
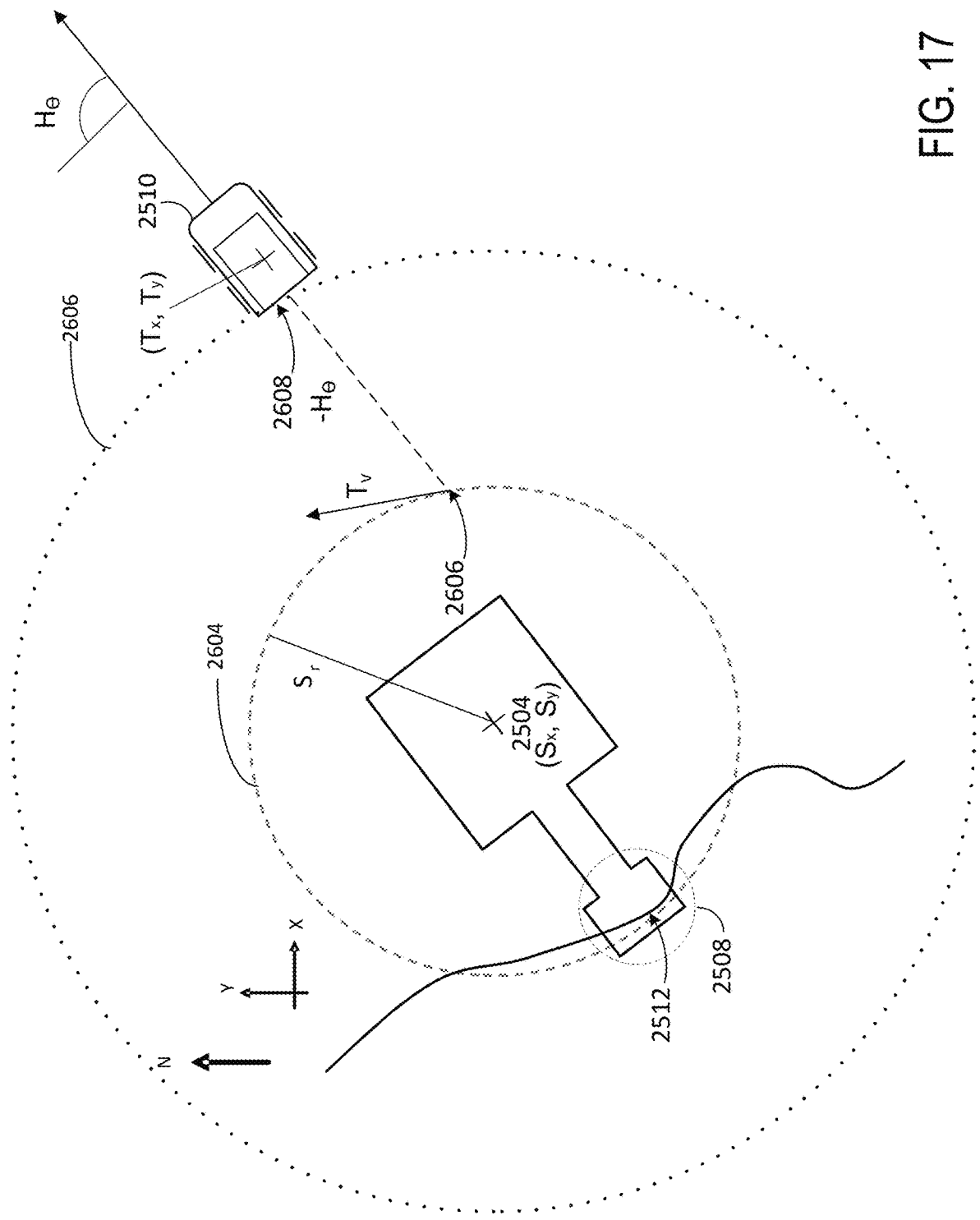
FIG. 17 is a schematic illustrating an offset of a vehicle from a loading path, according to some embodiments.
Figure 18:
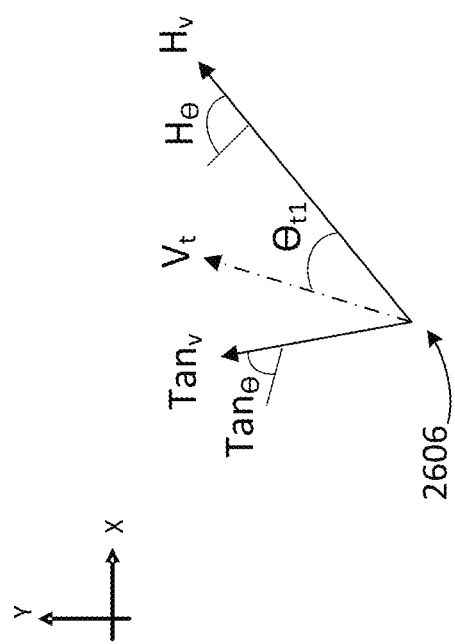
FIG. 18 is a schematic illustrating the relationship between a vehicle heading and a tangent vector of the loading path having a common intersection point, according to some embodiments.
Figure 19:
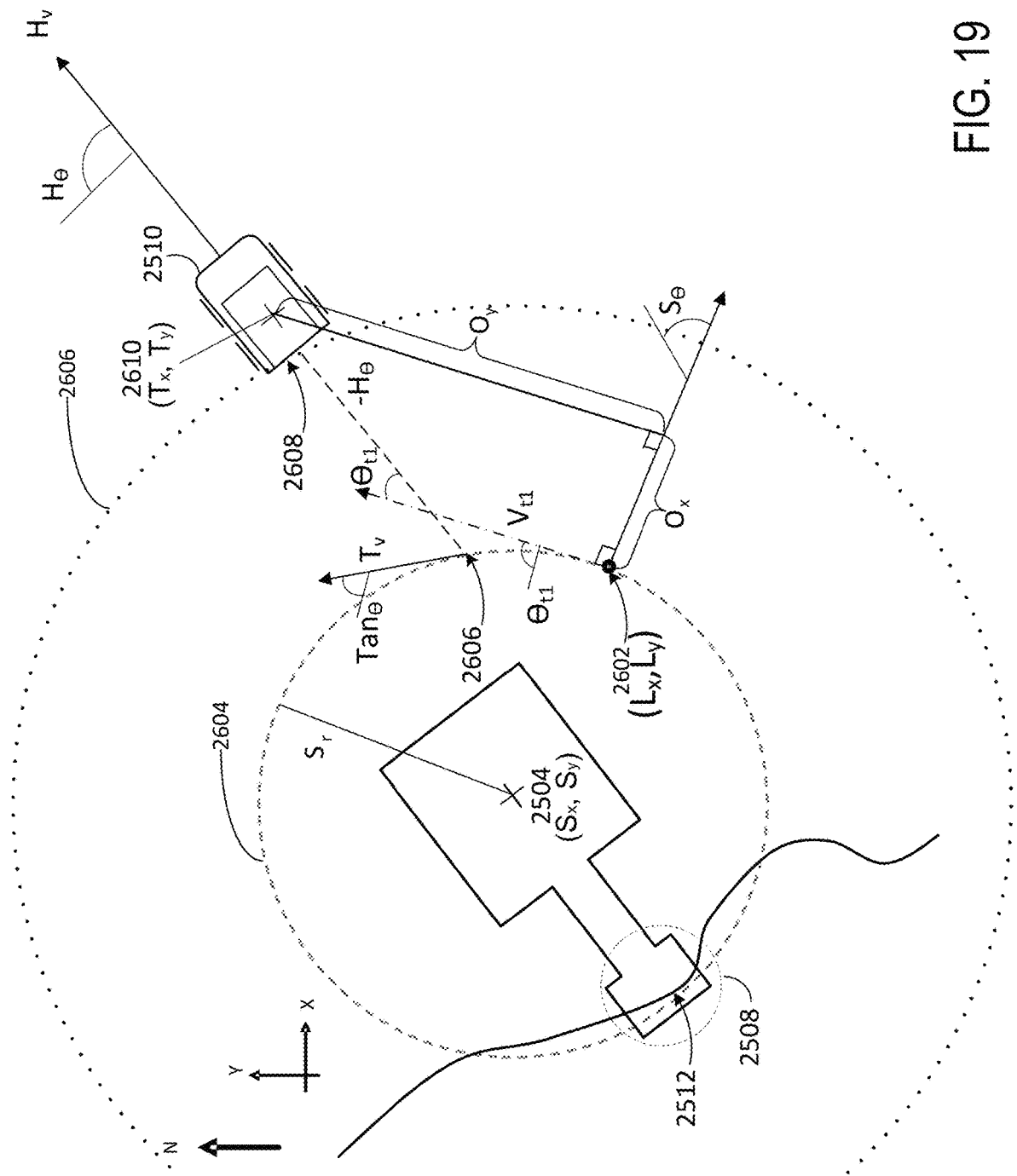
FIG. 19 is a schematic illustrating a first target loading zone on a loading path, according to some embodiments.

For example, in the embodiments illustrated in FIGS. 17-19, in some examples, a vehicle 2510 may approach a ROI 2606 proximate to the target loading zone 2602 and/or a loading path 2604 of the power shovel 2504. As illustrated in FIG. 16, the ROI 2606 is a concentric circle having a generally common axis as the loading path 2604. However, as provided herein, in some examples, the ROI 2606 may be a substantially wedge-shaped region or regions (e.g., from a top-down perspective) extending from one or more sides of the loading zone 2602 and/or any other shaped region that is proximate to the power shovel 2504. Once the vehicle 2510 is at least partially within the ROI 2606, or as the vehicle 2510 approaches the ROI 2606, the system and/or the HMI may provide the vehicle 2510 with instructions to position the vehicle 2510 such that a rear portion 2608 of the vehicle 2510 generally faces towards the power shovel 2504, the loading path 2604, or any other identifiable position. In addition, the system can determine the vehicle coordinates $(T_x, T_y)$, the vehicle heading He, and an inverse vehicle heading—$H_\theta$ to determine a vehicle vector $H_v$. As used herein, the "inverse heading" is a line extending in an opposite direction to that of the vehicle heading.

In some examples, once the inverse heading—$H_\theta$ intersects the loading path 2604, a first loading zone 2602 may be determined. Initially, an intersection point 2606 of the reverse heading—$H_\theta$ with the loading path 2604 is determined. Next, a tangent vector $T_v$ that is normal to the loading radius $S_r$ originating from the intersection point 2606 is determined. While the tangent vector $T_v$ can have a direction that extends in either of two opposing directions, in some examples, the direction of the tangent vector $T_v$ that forms an acute angle relative to the heading vector He is utilized.

As illustrated in FIG. 18, the vehicle heading $H_\theta$ can be translated to have a common origin with the heading $Tan_\theta$ of the tangent vector $T_v$ and a heading Oil of a first target vector $V_{t1}$ can be calculated as $$\theta_{t1} = \frac{Tan_\theta + H_\theta}{2}, \quad (7)$$

wherein $\theta_{t1}$ is the angle relative to the vehicle heading $H_\theta$ and/or the tangent vector $T_v$. It will be appreciated that in some examples, a tangent vector $T_v$ that forms a right angle or an obtuse angle relative to the vehicle heading $H_\theta$ may be utilized for determining the target vector of a target vector $V_{t1}$.

The first loading zone 2602 may be defined as a position along the loading path 2604 in which the heading $\theta_{t1}$ of the first target vector $V_{t1}$ is normal to the loading radius $S_r$. In addition, the system records the shovel center pin position 2504 $(S_x, S_y)$, heading $S_\theta$ (the orientation of the bucket 2508 relative to the North), and loading radius $S_r$. Accordingly, the coordinates $(L_x, L_y)$ of the first loading zone 2602 can be calculated as:

$$L_x = S_r \sin(S_\theta) + S_x \quad (8),$$

$$L_y = S_r \cos(S_\theta) + S_y \quad (9).$$

Then, vehicle offset positions are calculated. The vehicle offset position describes in terms of location and heading (e.g., orientation) how the vehicle is offset from the first loading zone 2602 when the vehicle 2510 arrives at a location 2610 of coordinates $(T_x, T_y)$ and heading $H_\theta$ with the rear portion 2608 of the vehicle 2510 generally positioned towards the ROI 2606. Offset coordinates $(O_x, O_y)$ ($O_x$ and $O_y$ can be referred to as lateral offset and longitudinal offset, respectively) and offset heading $O_\theta$ describe the vehicle's location and heading in a coordinate system with its origin at the first loading zone 2602 $(L_x, L_y)$ and its vertical axis parallel to the load heading $L_\theta$.

The offset coordinates $(O_x, O_y)$ can be calculated as:

$$O_x = (T_x - L_x)\cos(\theta_t) - (T_y - L_y)\sin(\theta_t) \quad (10),$$

$$O_y = (T_x - L_x)\sin(\theta_t) + (T_y - L_y)\cos(\theta_t) \quad (11)$$

The offset heading $O_\theta$ can be calculated as:

$$O_\theta = H_\theta - \theta_t \quad (12).$$

Lastly, based on trigger criteria, coordinates $(O_x, O_y)$ and heading $O_\theta$ are fed to a feedback mechanism. The feedback mechanism may link one or more of the offset variables to a visual or audio representation to provide instructions to the operator of the vehicle 2510 on the location of the first loading zone 2602. For example, as described with reference to FIG. 10, horizontal lights 1606 and 1608 could represent lateral offset $O_x$, central ring 1610 could represent offset heading $O_\theta$. Longitudinal offset $O_y$ could be indicated using an audible beep. The lateral and longitudinal offsets, $O_x$ and $O_y$, may be used to define locations within ROI 2606, such that each location within ROI 2606 is independently addressable by coordinates $(O_x, Oy)$.

Figure 20:
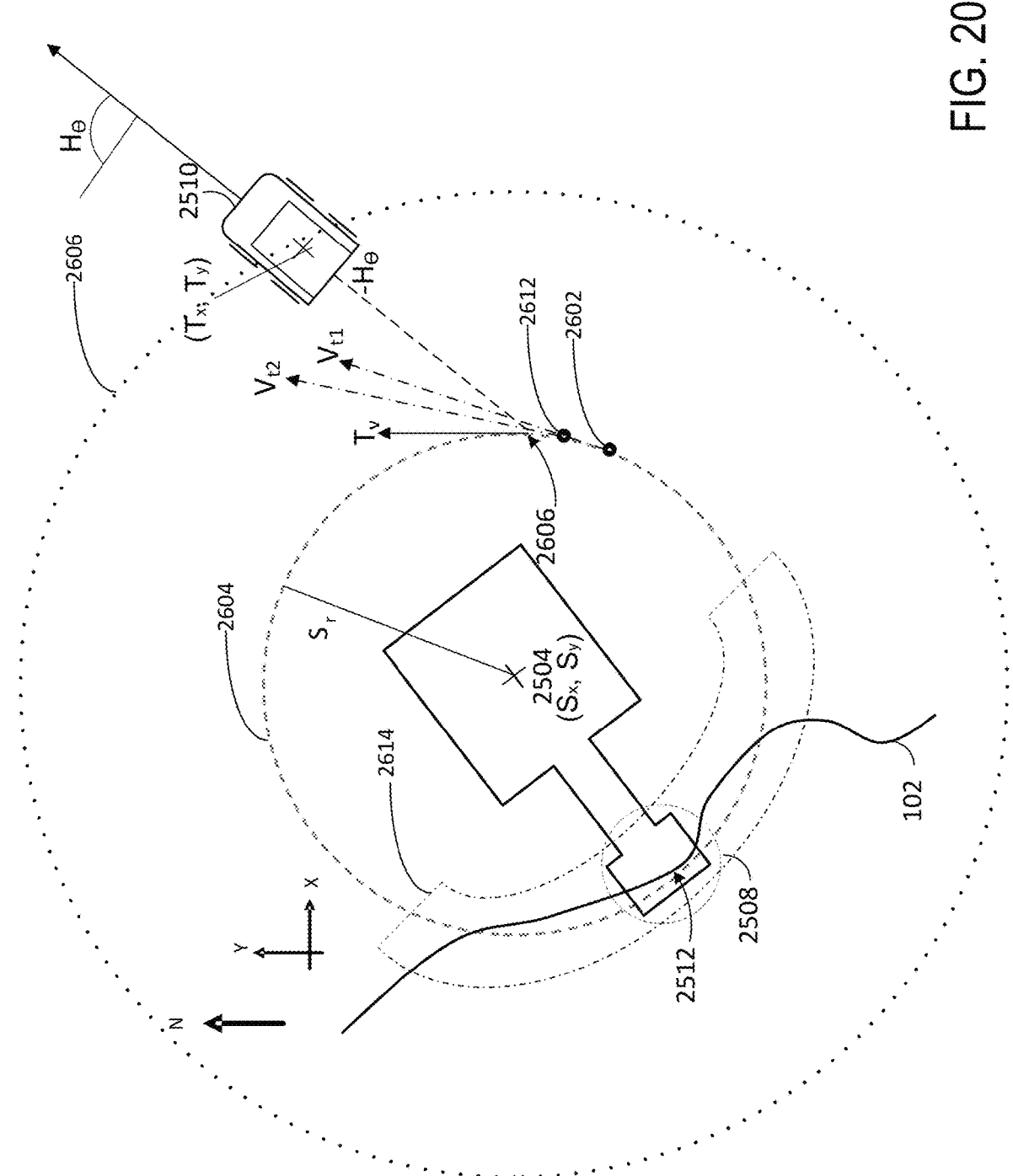
FIG. 20 is a schematic illustrating a second loading zone on the loading path, according to some embodiments.

As illustrated in FIG. 20, as the vehicle 2510 approaches the first loading zone 2602, the system may intermittently recalculate a second target loading zone 2612. The second loading zone 2612 may be based on updated vehicle positioning and kinematics and a second target vector Vt2 is calculated in a similar fashion to that used to calculate the first loading zone 2602 and the first target vector Vt1. Then, the second loading zone 2612 can be provided to the operator of the vehicle 2510. The system may update the target loading zone 2602 at predefined intervals, at predefined distances from the loading path 2604, or at any other frequency. In some examples, once a vehicle 2510 is aligned with a target vector Vt1, Vt2 and/or within a predefined distance of a target loading zone 2602, 2612, the system may cease updates of the loading zone 2602, 2612. Accordingly, any number of updated loading zones 2602 may be calculated once the vehicle 2510 is within the ROI 2606 and/or as the vehicle 2510 approached the loading path 2604.

The "successful" navigation of a vehicle 2510 into the loading zone 2602, 2612 may be defined based on whether the vehicle 2510 reached the loading zone 2602, 2612, the accuracy with which the vehicle entered the loading zone 2602, 2612 (e.g., based on heading and location), and/or feedback provided by the operator of the shovel 2504 with which the loading zone 2602, 2612 is associated. In some embodiments, additionally heading and speed data may also be collected from vehicles 2510 that attempted to, but did not successfully navigate into the loading zone 2602, 2612, and this historical heading and speed data may be used to further define the first and/or any sequential loading zone 2602, 2612 to further improve efficiency is aligning a vehicle 2510 with the loading path 2604 and/or a target loading zone 2602, 2612.

In some instances, the system may determine that, given the current location (e.g., based on lateral and longitudinal offsets) of the vehicle 2510, the heading and speed of the vehicle 2510 differs (e.g., beyond a predetermined threshold) from an aggregate heading value and an aggregate speed value such that positioning the vehicle 2510 at the target position is impracticable. In response to making such a determination, the system may send an alert (e.g., a wave-off alert) to the operator of the vehicle 2510 indicating that the driver should exit the ROI 2606 due to the non-ideal heading and/or speed of the vehicle 2510 and, optionally, should re-align and make another attempt to navigate to the loading zone 2602, 2612. In some embodiments, the wave-off alert may cause an HMI that has been providing guidance to the operator of the vehicle 2510 into the loading zone 2602, 2612 to cease providing this guidance and to provide an indicator to the operator that the guidance has ceased.

With further reference to FIG. 20, an arc on the loading path may be protected from receiving target locations thereon by defining a protected zone. For instance, when the shovel 2504 or other power machine is working along a mine face 102, an arc 2614 of the loading path 2604 that is proximate the mine face 102 may be protected from being used as the loading zone 2602, 2612. The protected arc 2614 may be of any length and may be predefined and stored in a database of the system based on various mine parameters including the type of vehicle 2510, the size of the vehicle 2510, the geometry of the mine face 102, and so on. Additional objects may be located proximate to the machine and can lead to various portions of the load path being protected from being defined as a target loading zone 2602, 2612. In various embodiments, the additional objects can include roadways, parking areas, repair facilities, buildings or structures, dumping areas, or power lines.

Additionally or alternatively, an operator of the mining equipment, the vehicle 2510, or someone located at a remote site may select or designate a protected arc 2614 of the lading path. The protected portion of the arc 2614 may refuse to allow target loading zones 2602, 2612 within the protected arc 2614 as long as the protected arc 2614 is defined as such. Once the mining equipment is moved to a new location, the protected arc 2614 may be reset and/or saved based on user preferences. In instances in which the loading zone 2602, 2612, is within the arc 2614, the system can send a wave-off alert to the operator of the vehicle 2510, indicating that the operator should navigate the vehicle 2510 out of the ROI 2606 and, if desired, re-align the vehicle 2510 in order to better position the vehicle for accurately entering the loading zone 2602, 2612. Or, in some embodiments, the target loading zone 2602, 2612 may be defined as a location along the loading path 2604 that is proximate and external to the arc 2614. In the embodiment of FIG. 20, the protected zone is shown as described as an arc. However, the protected zone may be any portion of the loading path having any shape without departing from the teachings provided herein.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A system, comprising:
    a position sensor mounted to a vehicle, the position sensor configured to identify a location of the vehicle, a heading of the vehicle, and a speed of the vehicle;
    an output device configured to generate one or more outputs; and
    a controller connected to the position sensor and the output device, the controller configured to:
        determine when the vehicle is within a region of interest (ROI) of a loading zone,
        determine that the vehicle has selected the loading zone as a target destination, and
        determine positioning instructions for the vehicle and provide the positioning instructions to the output device to assist an operator in placing the vehicle within the loading zone;
    wherein the instructions are determined on the basis of a comparison of the heading and speed of the vehicle within the region of interest to historical heading and speed data derived from other vehicles previously within the ROI that successfully navigated to the loading zone.

2. The system of claim 1, wherein the controller is further configured to determine that at least one vehicle dynamic of the vehicle is outside of an acceptable range and issue a wave-off alert to the output device, wherein the wave-off alert causes the output device to indicate that the vehicle should leave the ROI.

3. The system of claim 2, wherein the at least one vehicle dynamic comprises a speed of the vehicle.

4. The system of claim 2, wherein the at least one vehicle dynamic comprises a turn radius of the vehicle.

5. The system of claim 2, wherein the at least one vehicle dynamic comprises the heading of the vehicle.

6. The system of claim 1, wherein the positioning instructions are static once determined manually.

7. The system of claim 1, wherein the positioning instructions are updated from a first target zone to a second target zone as the vehicle approaches a loading path.

8. The system of claim 7, wherein the first and second target zones are separated by an arc having a common radius.

9. The system of claim 8, wherein a length of the common radius is determined by a boom radius of a power shovel.

10. The system of claim 7, wherein the second target zone is calculated when the vehicle is a predefined distance from the loading path.

11. The system of claim 7, wherein the second target zone is calculated at a predefined time interval after calculation of the first target zone.

12. The system of claim 11, wherein the controller is further configured to accept inputs regarding a user-selected loading zone as an intended target destination for the vehicle.

13. The system of claim 11, wherein the controller is further configured to calculate a loading zone based on the heading and the speed of the vehicle within the ROI.

14. The system of claim 1, wherein the loading zone is positioned along a loading path defined by a loading radius of a power shovel, and wherein the controller is configured to send a wave-off instruction when the vehicle is approaching a predefined protected arc of the loading path.

15. A system, comprising:
    a position sensor mounted to a vehicle, the position sensor configured to identify a location of the vehicle, a heading of the vehicle, and a speed of the vehicle;
    an output device configured to generate one or more outputs; and
    a controller connected to the position sensor and the output device, the controller configured to:
        determine when the vehicle is within a region of interest (ROI) of a loading zone,
        determine that the vehicle has selected the loading zone as a target destination, and
        determine positioning instructions for the vehicle and provide the positioning instructions to the output device to assist an operator in placing the vehicle within the loading zone;
    wherein the controller is further configured to compare the heading and speed of the vehicle within the region of interest to historical heading and speed data derived from other vehicles previously within the ROI that successfully navigated to the loading zone, and on the basis of the comparison, issue a wave-off alert to the output device, wherein the wave-off alert causes the output device to indicate that the vehicle should leave the ROI.

16. The system of claim 15, wherein comparing the heading and speed of the vehicle within the region of interest to historical heading and speed data derived from other vehicles previously within the ROI that successfully navigated to the loading zone comprises determining whether a deviation between the heading of the vehicle and historical aggregate headings of other vehicles exceeds a threshold.

17. The system of claim 15 wherein comparing the heading and speed of the vehicle within the region of interest to historical heading and speed data derived from other vehicles previously within the ROI that successfully navigated to the loading zone comprises determining whether a deviation between the heading of the vehicle and historical aggregate speed of other vehicles exceeds a threshold.

* * * * *